US008730877B2

(12) United States Patent
Palanki et al.

(10) Patent No.: US 8,730,877 B2
(45) Date of Patent: May 20, 2014

(54) PILOT AND DATA TRANSMISSION IN A QUASI-ORTHOGONAL SINGLE-CARRIER FREQUENCY DIVISION MULTIPLE ACCESS SYSTEM

(75) Inventors: Ravi Palanki, San Diego, CA (US); Aamod Khandekar, San Diego, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 797 days.

(21) Appl. No.: 11/242,115

(22) Filed: Sep. 30, 2005

(65) Prior Publication Data

US 2007/0014272 A1    Jan. 18, 2007

Related U.S. Application Data

(60) Provisional application No. 60/691,701, filed on Jun. 16, 2005, provisional application No. 60/702,033, filed on Jul. 22, 2005, provisional application No. 60/710,366, filed on Aug. 22, 2005.

(51) Int. Cl.
*H04W 4/00* (2009.01)

(52) U.S. Cl.
USPC ............. 370/329; 455/42; 455/450; 455/561; 455/550.1; 370/343; 708/404

(58) Field of Classification Search
USPC ................. 455/42, 450, 550.1; 370/328, 343; 708/404
See application file for complete search history.

(56) References Cited

U.S. PATENT DOCUMENTS 5,867,478 A * 2/1999 Baum et al. .................. 370/203
6,266,321 B1   7/2001 Pehkonen et al.
(Continued)

FOREIGN PATENT DOCUMENTS

EP    1083719 A2    3/2001
EP    0722235 B1    3/2004
(Continued)

OTHER PUBLICATIONS

Uli Sorger, Isabella De Broeck, Michael Schnell, Interleaved FDMA—A New Spread Spectrum Multiple Acess Scheme, Sep. 1998, IEEE.*

(Continued)

*Primary Examiner* — Vladimir Magloire
(74) *Attorney, Agent, or Firm* — Stanton Braden

(57) ABSTRACT

In a single-carrier frequency division multiple access (SC-FDMA) system that utilizes interleaved FDMA (IFDMA) or localized FDMA, multiple transmitters may transmit their pilots using time division multiplexing (TDM), code division multiplexing (CDM), interleaved frequency division multiplexing (IFDM), or localized frequency division multiplexing (LFDM). The pilots from these transmitters are then orthogonal to one another. A receiver performs the complementary demultiplexing for the pilots sent by the transmitters. The receiver may derive a channel estimate for each transmitter using an MMSE technique or a least-squares technique. The receiver may receive overlapping data transmissions sent on the same time-frequency block by the multiple transmitters and may perform receiver spatial processing with spatial filter matrices to separate these data transmissions. The receiver may derive the spatial filter matrices based on the channel estimates for the transmitters and using zero-forcing, MMSE, or maximal ratio combining technique.

67 Claims, 19 Drawing Sheets

(56) References Cited

U.S. PATENT DOCUMENTS

| | | |
|---|---|---|
| 6,535,502 B1* | 3/2003 | Brink .................... 370/345 |
| 6,545,997 B1* | 4/2003 | Bohnke et al. ............ 370/347 |
| 6,904,283 B2* | 6/2005 | Li et al. ................. 455/450 |
| 7,333,465 B2 | 2/2008 | Jou |
| 2001/0024449 A1 | 9/2001 | Lundby et al. |
| 2002/0122381 A1 | 9/2002 | Wu et al. |
| 2004/0131007 A1* | 7/2004 | Smee et al. ............. 370/208 |
| 2004/0165676 A1* | 8/2004 | Krishnan et al. ......... 375/267 |
| 2004/0190640 A1* | 9/2004 | Dubuc et al. ............ 375/260 |
| 2004/0208254 A1 | 10/2004 | Lee et al. |
| 2004/0228267 A1* | 11/2004 | Agrawal et al. .......... 370/203 |
| 2005/0123138 A1 | 6/2005 | Abe et al. |
| 2005/0163194 A1 | 7/2005 | Gore et al. |
| 2005/0181737 A1 | 8/2005 | Kobayashi et al. |
| 2005/0249180 A1 | 11/2005 | Murakami et al. |

FOREIGN PATENT DOCUMENTS

| | | | |
|---|---|---|---|
| EP | 1443682 A2 | 8/2004 | |
| JP | 200318054 | 1/2003 | |
| JP | 2003152603 | 5/2003 | |
| JP | 200432679 | 1/2004 | |
| JP | 2004007279 A | 1/2004 | |
| JP | 2004120730 A | 4/2004 | |
| JP | 2004304760 | 10/2004 | |
| JP | 2005509360 | 4/2005 | |
| JP | 2005521358 | 7/2005 | |
| JP | 2006504339 A | 2/2006 | |
| JP | 2006520109 | 8/2006 | |
| JP | 2007508786 A | 4/2007 | |
| RU | 2214060 C2 | 10/2003 | |
| RU | 2216866 | 11/2003 | |
| WO | WO9901994 | 1/1999 | |
| WO | WO03034519 | 4/2003 | |
| WO | WO03041300 | 5/2003 | |
| WO | WO03058871 | 7/2003 | |
| WO | 03085876 | 10/2003 | |
| WO | WO2004038984 A2 | 5/2004 | |
| WO | WO 2005041515 A1 * | 5/2005 | .............. H04L 27/26 |

OTHER PUBLICATIONS

Schnell, M. et al, "A promising new wideband multiple-access scheme for future mobile communications systems," European Transactions on Telecommunications vol. 10 No. 4, pp. 417-427, Wiley & Sons, Chichester, GB, Jul. 1999.

Dinis, R. et al.: "A Multiple Access Scheme for the Uplink of Broadband Wireless Systems," Global Telecommunications Conference, 2004. GLOBECOM "04. IEEE Dallas, TX, USA Nov. 29-Dec. 3, 2004, vol. 6, pp. 3808-3812, XP010758449 Piscataway, NJ, USA, IEEE.

European Search Report—EP10176431—Search Authority—Berlin—Oct. 12, 2010.

International Search Report—PCT/US06/022728, International Search Authority—European Peten Office—Oct. 19, 2006.

Kishigami, et al., "A Study on DOA Estimation by multi-path combined signal at W-CDMA macro-cell BS", Technical Report of IEICE, SST2002-106, SST2002-91 to 126, IEICE Technical Report, Mar. 6, 2003, 13 pages.

Technical Report of the Institute of Electronics, Information and Communication Engineers (IEICE), CS2004-246.

Written Opinion—PCT/US06/022728, International Search Authority, European Patent Office, Oct. 19, 2006.

Yang H., "A road to future broadband wireless acess: MIMO-OFDM-Based air interface," IEEE Communications Magazine, vol. 43, No. 1, 2005, pp. 53-60.

Taiwan Search Report—TW098140712—TIPO—Sep. 12, 2013.

* cited by examiner

PILOT AND DATA TRANSMISSION IN A QUASI-ORTHOGONAL SINGLE-CARRIER FREQUENCY DIVISION MULTIPLE ACCESS SYSTEM

CLAIM OF PRIORITY UNDER 35 U.S.C. §119

The present Application for Patent claims priority to Provisional Application No. 60/710,366 entitled "PILOT AND DATA TRANSMISSION IN A QUASI-ORTHOGONAL SINGLE-CARRIER FREQUENCY DIVISION MULTIPLE ACCESS SYSTEM" filed Aug. 22, 2005, Provisional Application No. 60/691,701 entitled "PILOT AND DATA TRANSMISSION IN A QUASI-ORTHOGONAL SINGLE-CARRIER FREQUENCY DIVISION MULTIPLE ACCESS SYSTEM" filed Jun. 16, 2005, and Provisional Application Ser. No. 60/702,033 filed Jul. 22, 2005 assigned to the assignee hereof and all hereby expressly incorporated by reference herein.

BACKGROUND

I. Field

The present disclosure relates generally to communication, and more specifically to pilot and data transmission in a wireless communication system.

II. Background

A multiple-access system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the multiple data transmissions on each link to be orthogonal to one another in time, frequency and/or code domain. Complete orthogonality among the multiple data transmissions is typically not achieved in most instances due to various factors such as channel conditions, receiver imperfections, and so on. Nevertheless, the orthogonal multiplexing ensures that the data transmission for each terminal minimally interferes with the data transmissions for the other terminals.

The number of terminals that can communicate with the multiple-access system at any given moment is typically limited by the number of traffic channels available for data transmission, which in turn is limited by the available system resources. For example, the number of traffic channels may be determined by the number of available orthogonal code sequences in a code division multiple access (CDMA) system, the number of available frequency subbands in a frequency division multiple access (FDMA) system, the number of available time slots in a time division multiple access (TDMA) system, and so on. In many instances, it is desirable to allow more terminals to simultaneously communicate with the system in order to improve system capacity.

There is therefore a need in the art for techniques to support simultaneous transmissions for more terminals in a multiple-access system.

SUMMARY

Pilot transmission, channel estimation, and spatial processing techniques that support simultaneous transmissions for terminals in a single-carrier frequency division multiple access (SC-FDMA) system are described herein. The SC-FDMA system may utilize (1) interleaved FDMA (IFDMA) to transmit data and pilot on subbands that are distributed across a frequency band or system bandwidth, (2) localized FDMA (LFDMA) to transmit data and pilot on a group of adjacent subbands, or (3) enhanced FDMA (EFDMA) to transmit data and pilot on multiple groups of adjacent subbands. IFDMA is also called distributed FDMA, and LFDMA is also called narrowband FDMA, classical FDMA, and FDMA.

For pilot transmission, multiple transmitters may transmit their pilots using time division multiplexing (TDM), code division multiplexing (CDM), interleaved frequency division multiplexing (IFDM), or localized frequency division multiplexing (LFDM), as described below. The pilots from these transmitters would then be orthogonal to one another, which allows a receiver to derive a higher quality channel estimate for each transmitter.

For channel estimation, the receiver performs the complementary demultiplexing for the pilots sent by the transmitters with TDM, CDM, IFDM or LFDM. The receiver may derive a channel estimate for each transmitter using, e.g., a minimum mean-square error (MMSE) technique, a least-squares (LS) technique, or some other channel estimation technique. The receiver may also perform filtering, thresholding, truncation, and/or tap selection to obtain an improved channel estimate.

The receiver also performs receiver spatial processing for data transmissions received from the transmitters on the same time-frequency block. The receiver may derive spatial filter matrices based on the channel estimates for the transmitters and using, e.g., a zero-forcing (ZF) technique, an MMSE technique, or a maximal ratio combining (MRC) technique.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The pilot transmission, channel estimation, and spatial processing techniques described herein may be used for various communication systems. For example, these techniques may be used for an SC-FDMA system that utilizes IFDMA, LFDMA, or EFDMA, an orthogonal frequency division multiple access (OFDMA) system that utilizes orthogonal frequency division multiplexing (OFDM), other FDMA systems, other OFDM-based systems, and so on. Modulation symbols are sent in the time domain with IFDMA, LFDMA, and EFDMA and in the frequency domain with OFDM. In general, the techniques may be used for a system that utilizes one or more multiplexing schemes for the forward and reverse links. For example, the system may utilize (1) SC-FDMA (e.g., IFDMA, LFDMA or EFDMA) for both the forward and reverse links (2) one version of SC-FDMA (e.g., LFDMA) for one link and another version of SC-FDMA (e.g., IFDMA) for the other link, (3) MC-FDMA for both the forward and reverse links, (4) SC-FDMA for one link (e.g., reverse link) and MC-FDMA (e.g., OFDMA) for the other link (e.g., forward link), or (5) some other combination of multiplexing schemes. SC-FDMA, OFDMA, some other multiplexing scheme, or a combination thereof may be used for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower PAPR and to relax the power amplifier requirements for the terminals. It may be desirable to use OFDMA on the forward link to potentially achieve higher system capacity.

The techniques described herein may be used for the downlink and uplink. The techniques may also be used for (1) an orthogonal multiple-access system in which all users within a given cell or sector are orthogonal in time, frequency and/or code and (2) a quasi-orthogonal multiple-access system in which multiple users within the same cell or sector may transmit simultaneously on the same frequency at the same time. For clarity, much of the description below is for a quasi-orthogonal SC-FDMA system, which is also called a Q-FDMA system. The Q-FDMA system supports space division multiple access (SDMA), which uses multiple antennas located at different points in space to support simultaneous transmissions for multiple users.

Figure 1:
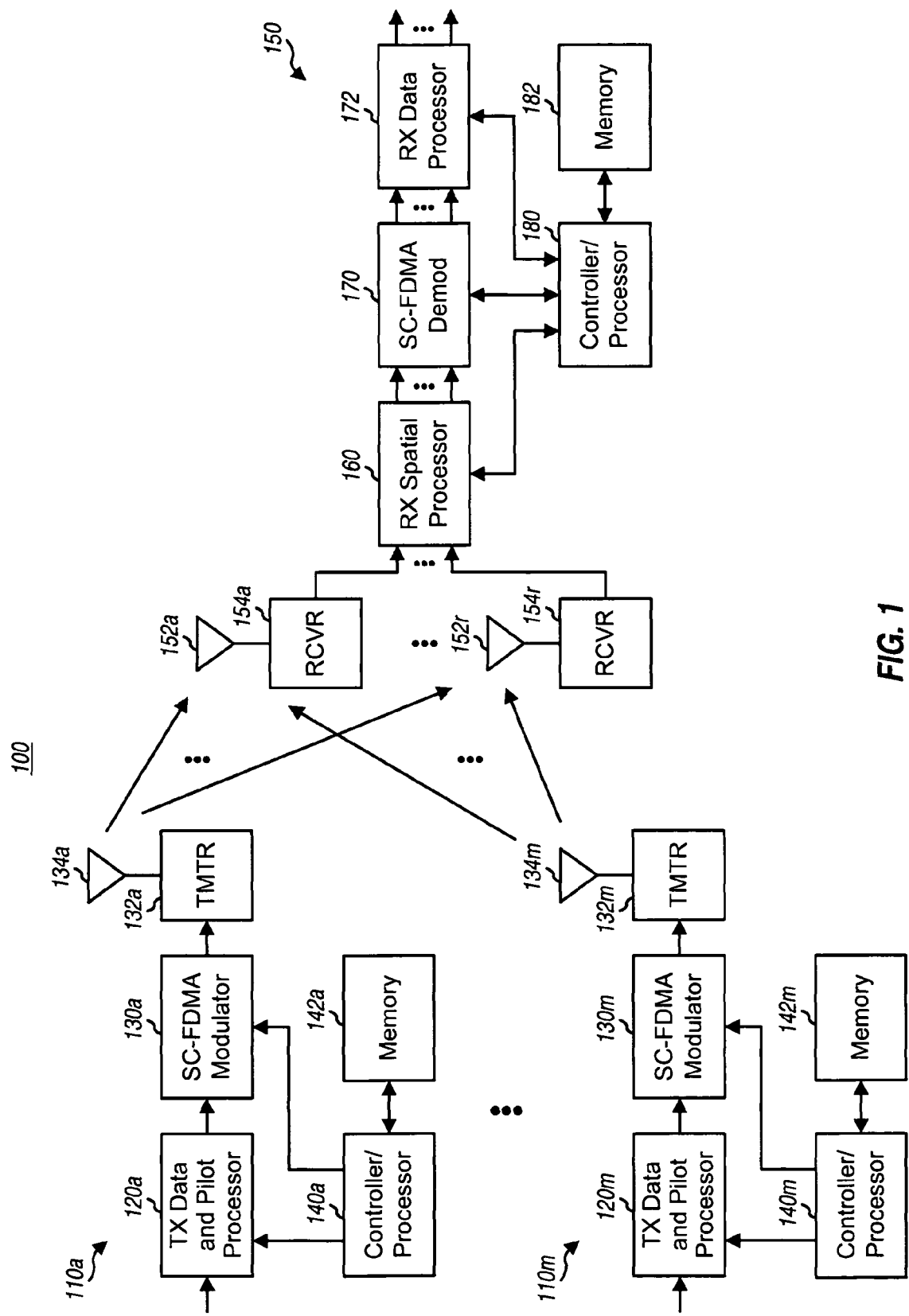
FIG. 1 shows a Q-FDMA system with multiple transmitters and a receiver.

FIG. 1 shows a Q-FDMA system 100 with multiple (M) transmitters 110a through 110m and a receiver 150. For simplicity, each transmitter 110 is equipped with a single antenna 134, and receiver 150 is equipped with multiple (R) antennas 152a through 152r. For the forward link, each transmitter 110 may be part of a base station, and receiver 150 may be part of a terminal. For the reverse link, each transmitter 110 may be part of a terminal, and receiver 150 may be part of a base station. A base station is generally a fixed station and may also be called a base transceiver system (BTS), an access point, or some other terminology. A terminal may be fixed or mobile and may be a wireless device, a cellular phone, a personal digital assistant (PDA), a wireless modem card, and so on.

At each transmitter 110, a transmit (TX) data and pilot processor 120 encodes, interleaves, and symbol maps traffic data and generates data symbols, which are modulation symbols for traffic data. A modulation symbol is a complex value for a point in a signal constellation, e.g., for M-PSK or M-QAM. Processor 120 also generates pilot symbols, which are modulation symbols for pilot. An SC-FDMA modulator 130 multiplexes the data symbols and pilot symbols, performs SC-FDMA modulation (e.g., for IFDMA, LFDMA, or EFDMA), and generates SC-FDMA symbols. An SC-FDMA symbol may be an IFDMA symbol, an LFDMA symbol, or an EFDMA symbol. A data SC-FDMA symbol is an SC-FDMA symbol for traffic data, and a pilot SC-FDMA symbol is an SC-FDMA symbol for pilot. A transmitter unit (TMTR) 132 processes (e.g., converts to analog, amplifies, filters, and frequency upconverts) the SC-FDMA symbols and generates a radio frequency (RF) modulated signal, which is transmitted via an antenna 134.

At receiver 150, R antennas 152a through 152r receive the RF modulated signals from transmitters 110a through 110m, and each antenna provides a received signal to an associated receiver unit (RCVR) 154. Each receiver unit 154 conditions (e.g., filters, amplifies, frequency downconverts, and digitizes) its received signal and provides input samples to a receive (RX) spatial processor 160. RX spatial processor 160 estimates the channel response between each transmitter 110 and the R antennas based on the pilot received from that transmitter. RX spatial processor 160 also performs receiver spatial processing for each subband used by multiple transmitters in order to separate out the data symbols sent by these transmitters. RX spatial processor 160 further demultiplexes the SC-FDMA symbols received for each transmitter. An SC-FDMA demodulator (Demod) 170 performs SC-FDMA demodulation on the detected SC-FDMA symbols for each transmitter and provides data symbol estimates for that transmitter. An RX data processor 172 symbol demaps, deinterleaves, and decodes the data symbol estimates for each transmitter and provides decoded data for that transmitter. In general, the processing by receiver 150 is complementary to the processing by transmitters 110a through 110m.

Controllers 140a through 140m and controller 180 direct the operation of various processing units at transmitters 110a through 110m and receiver 150, respectively. Memories 142a through 142m and memory 182 store program codes and data for transmitters 110a through 110m and receiver 150, respectively.

System 100 may utilize IFDMA, LFDMA, or EFDMA for transmission. The subband structures and symbol generation for IFDMA, LFDMA, and EFDMA are described below.

Figure 2A:
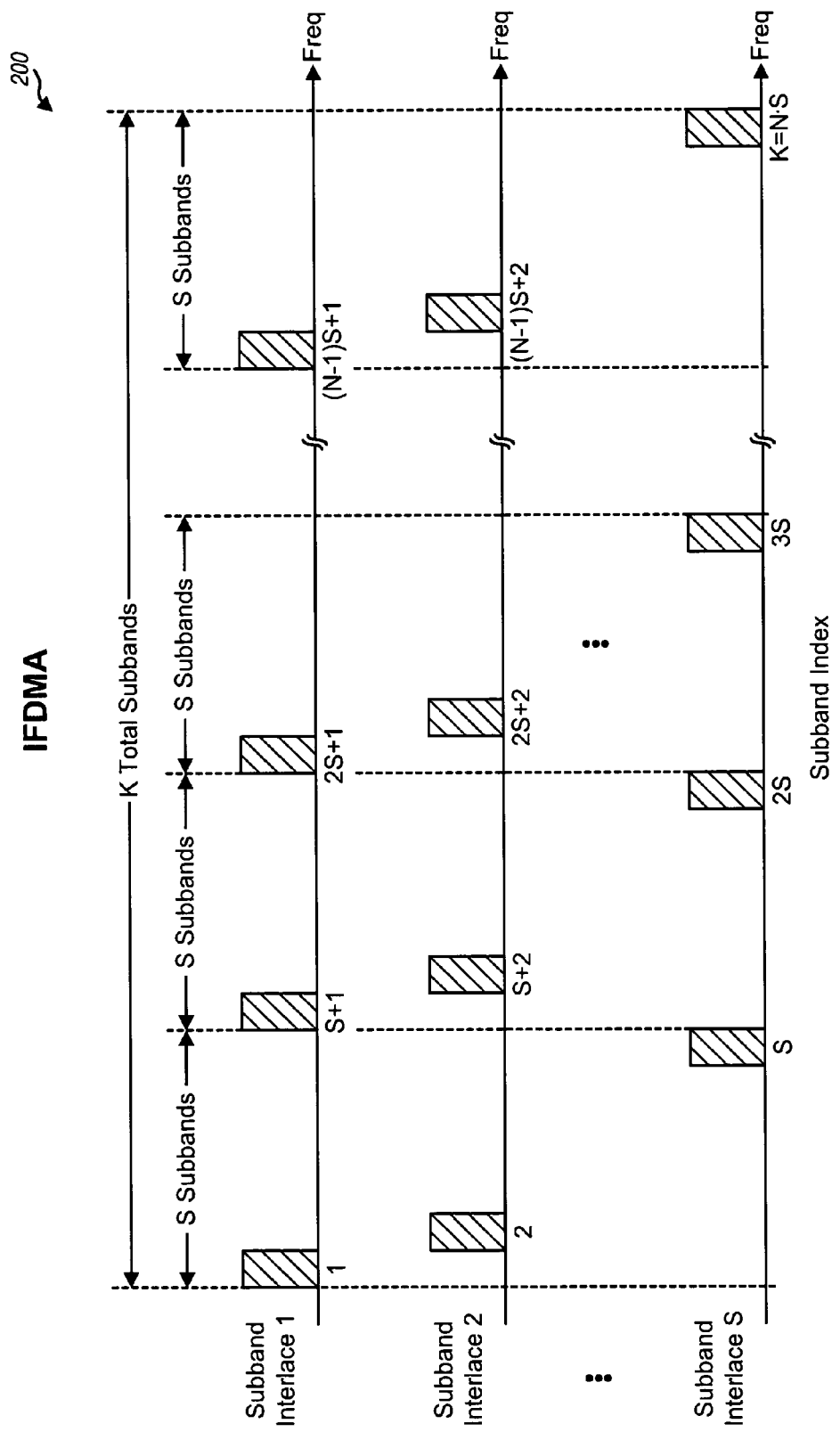
FIG. 2A shows an exemplary subband structure for IFDMA.

FIG. 2A shows an exemplary subband structure 200 for IFDMA. The overall system bandwidth of BW MHz is partitioned into multiple (K) orthogonal subbands that are given indices of 1 through K, where K may be any integer value. For example, K may be equal to a power of two (e.g., 64, 128, 256, 512, 1024, and so on), which can simplify the transformation between the time and frequency domains. The spacing between adjacent subbands is BW/K MHz. For simplicity, the following description assumes that all K total subbands are usable for transmission. For subband structure 200, the K subbands are arranged into S disjoint or non-overlapping interlaces. The S interlaces are disjoint in that each of the K subbands belongs in only one interlace. In an embodiment, each interlace contains N subbands that are uniformly distributed across the K total subbands, and consecutive subbands in the interlace are spaced apart by S subbands, where K=S·N. For this embodiment, interlace u contains subbands u, S+u, 2S+u, ..., (N−1)·S+u, where u∈{1, ..., S}. Index u is the interlace index as well as a subband offset that indicates the first subband in the interlace. In general, a subband structure may include any number of interlaces, each interlace may contain any number of subbands, and the interlaces may contain the same or different numbers of subbands. Furthermore, N may or may not be an integer divisor of K, and the N subbands may or may not be uniformly distributed across the K total subbands.

Figure 2B:
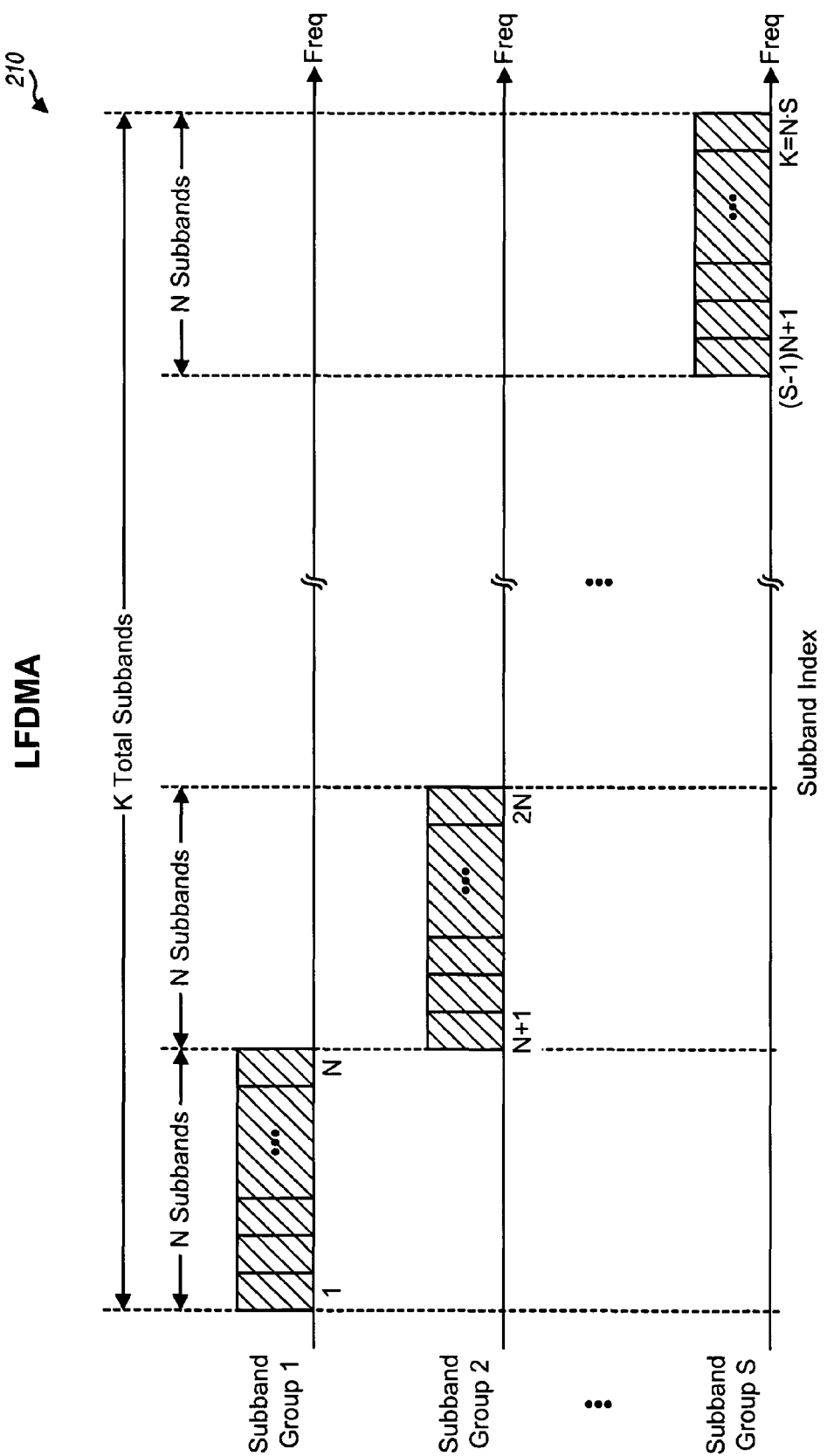
FIG. 2B shows an exemplary subband structure for LFDMA.

FIG. 2B shows an exemplary subband structure 210 for LFDMA. For subband structure 210, the K total subbands are arranged into S non-overlapping groups. In an embodiment, each group contains N subbands that are adjacent to one another, and group v contains subbands (v−1)·N+1 through v·N, where v is the group index and v∈{1, ..., S}. N and S for subband structure 210 may be the same or different from N and S for subband structure 200. In general, a subband structure may include any number of groups, each group may contain any number of subbands, and the groups may contain the same or different numbers of subbands.

Figure 2C:
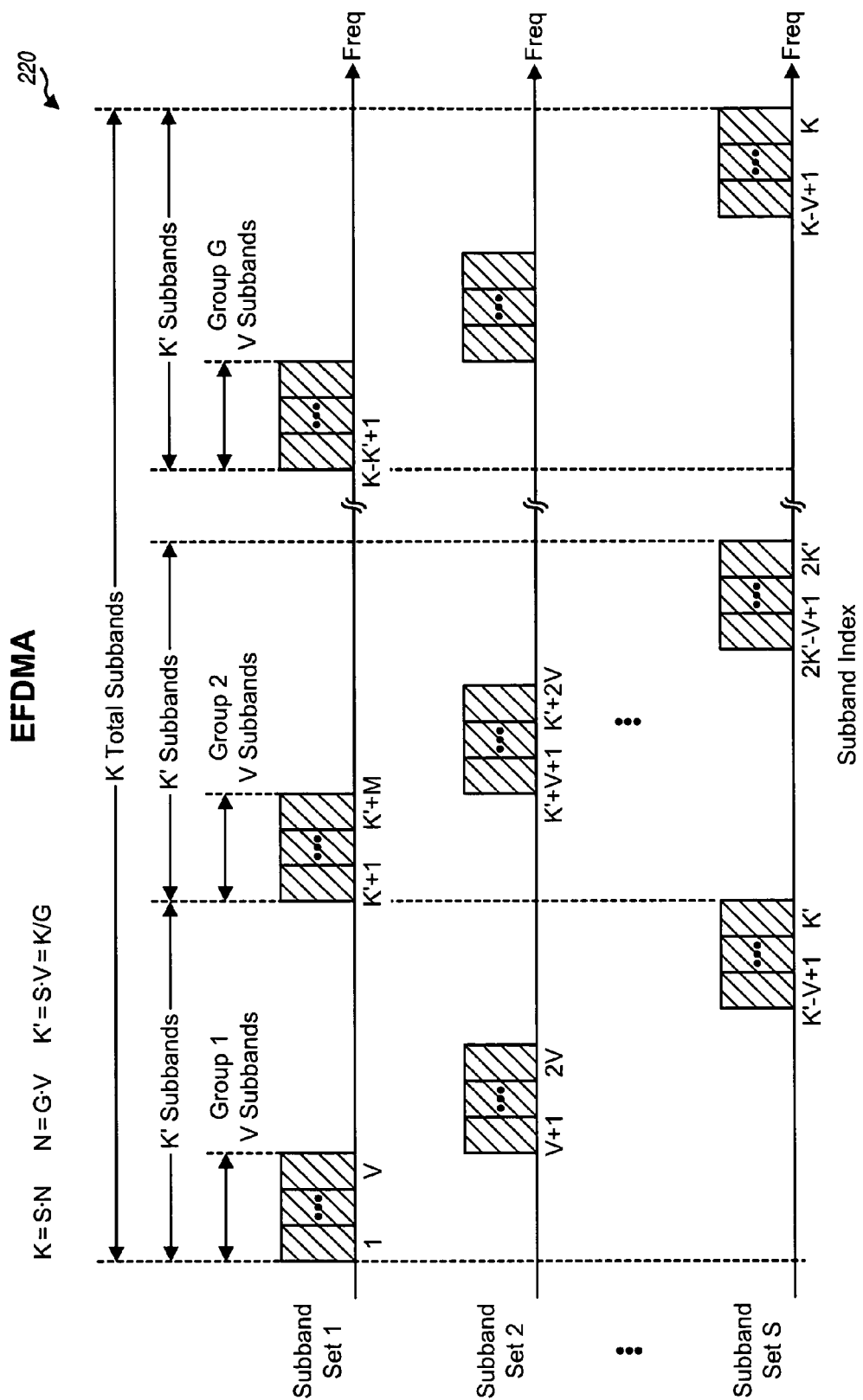
FIG. 2C shows an exemplary subband structure for EFDMA.

FIG. 2C shows an exemplary subband structure 220 for EFDMA. For subband structure 220, the K total subbands are arranged into S non-overlapping sets, with each set including G groups of subbands. In an embodiment, the K total subbands are distributed to the S sets as follows. The K total subbands are first partitioned into multiple frequency ranges, with each frequency range containing K'=K/G consecutive subbands. Each frequency range is further partitioned into S groups, with each group including V consecutive subbands. For each frequency range, the first V subbands are allocated to set 1, the next V subbands are allocated to set 2, and so on, and the last V subbands are allocated to set S. Set s, for s=1, ..., S, includes subbands having indices k that satisfy the following: (s−1)·V≤k modulo (K/G)<s·V. Each set contains G groups of V consecutive subbands, or a total of N=G·V subbands. In general, a subband structure may include any number of sets, each set may contain any number of groups and any number of subbands, and the sets may contain the same or different numbers of subbands. For each set, the groups may contain the same or different numbers of subbands and may be distributed uniformly or non-uniformly across the system bandwidth.

An SC-FDMA system may also utilize a combination of IFDMA, LFDMA, and/or EFDMA. In an embodiment, multiple interlaces may be formed for each subband group, and each interlace may be allocated to one or more users for transmission. For example, two interlaces may be formed for each subband group, the first interlace may contain subbands with even-numbered indices, and the second interlace may contain subbands with odd-numbered indices. In another embodiment, multiple subband groups may be formed for each interlace, and each subband group may be allocated to one or more users for transmission. For example, two subband groups may be formed for each interlace, the first subband group may contain the lower subbands in the interlace, and the second subband group may contain the upper subbands in the interlace. IFDMA, LFDMA, EFDMA, and combinations thereof may be considered as different versions of SC-FDMA. For each version of SC-FDMA, multiple users may transmit orthogonal pilots on a given subband set (e.g., an interlace or a subband group) by partitioning the subband set into multiple subsets and assigning each user with a respective subset for pilot transmission.

Figure 3A:
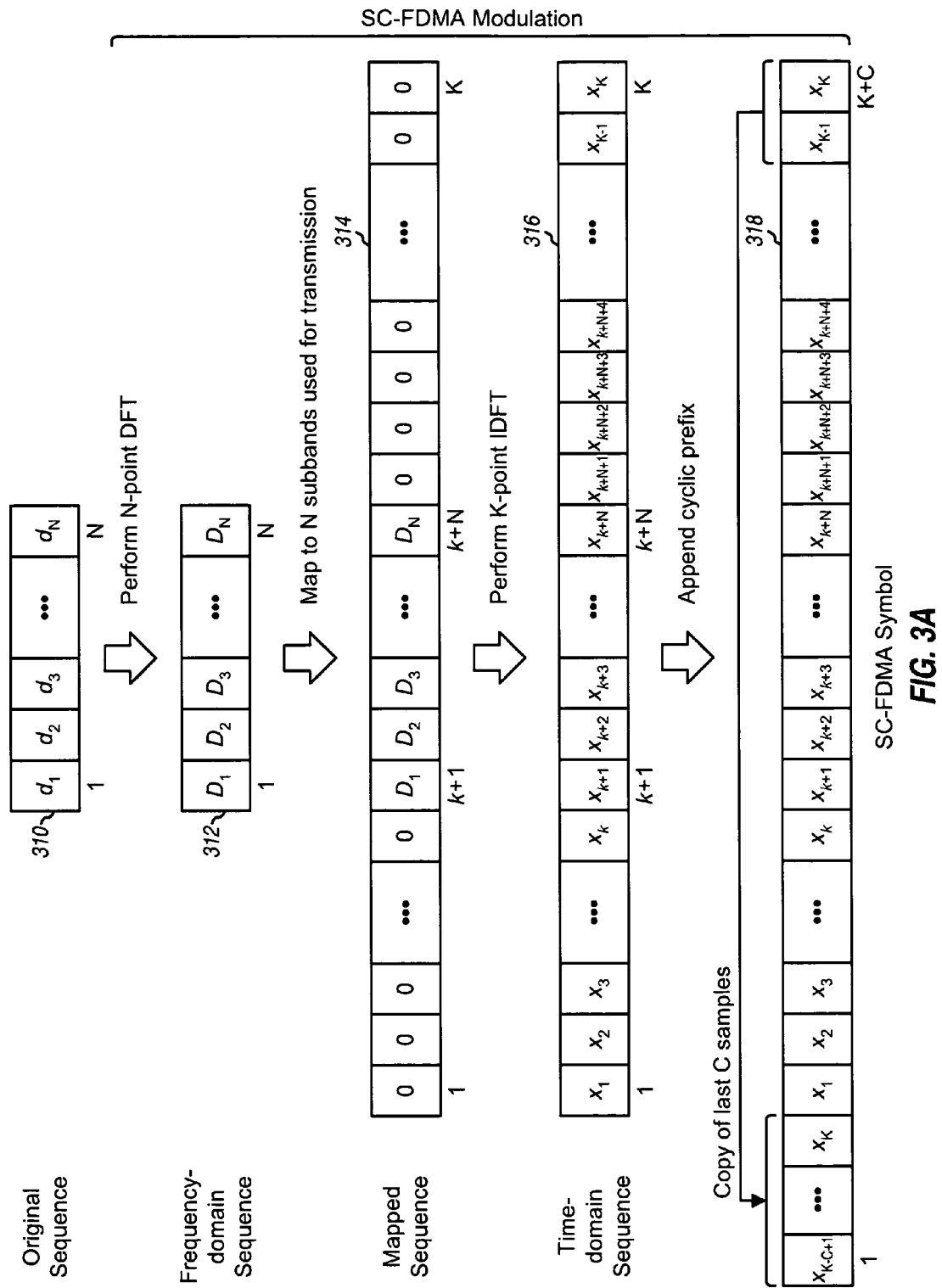
FIG. 3A shows the generation of an IFDMA, LFDMA or EFDMA symbol.

FIG. 3A shows the generation of an IFDMA symbol for one interlace, an LFDMA symbol for one subband group, or an EFDMA symbol for one subband set. An original sequence of N modulation symbols to be transmitted in one symbol period on the interlace, subband group, or subband set is denoted as $\{d_1, d_2, d_3, \ldots, d_N\}$ (block 310). The original sequence is transformed to the frequency domain with an N-point discrete Fourier transform (DFT) to obtain a sequence of N frequency-domain values (block 312). The N frequency-domain values are mapped onto the N subbands used for transmission, and K−N zero values are mapped onto the remaining K−N subbands to generate a sequence of K values (block 314). The N subbands used for transmission are in one group of adjacent subbands for LFDMA (as shown in FIG. 3A), are in one interlace with subbands distributed across the K total subbands for IFDMA (not shown in FIG. 3A), and are in one set of multiple groups of subbands for EFDMA (also not shown in FIG. 3A). The sequence of K values is then transformed to the time domain with a K-point inverse discrete Fourier transform (IDFT) to obtain a sequence of K time-domain output samples (block 316).

The last C output samples of the sequence are copied to the start of the sequence to form an IFDMA, LFDMA, or EFDMA symbol that contains K+C output samples (block 318). The C copied output samples are often called a cyclic prefix or a guard interval, and C is the cyclic prefix length. The cyclic prefix is used to combat intersymbol interference (ISI) caused by frequency selective fading, which is a frequency response that varies across the system bandwidth.

Figure 3B:
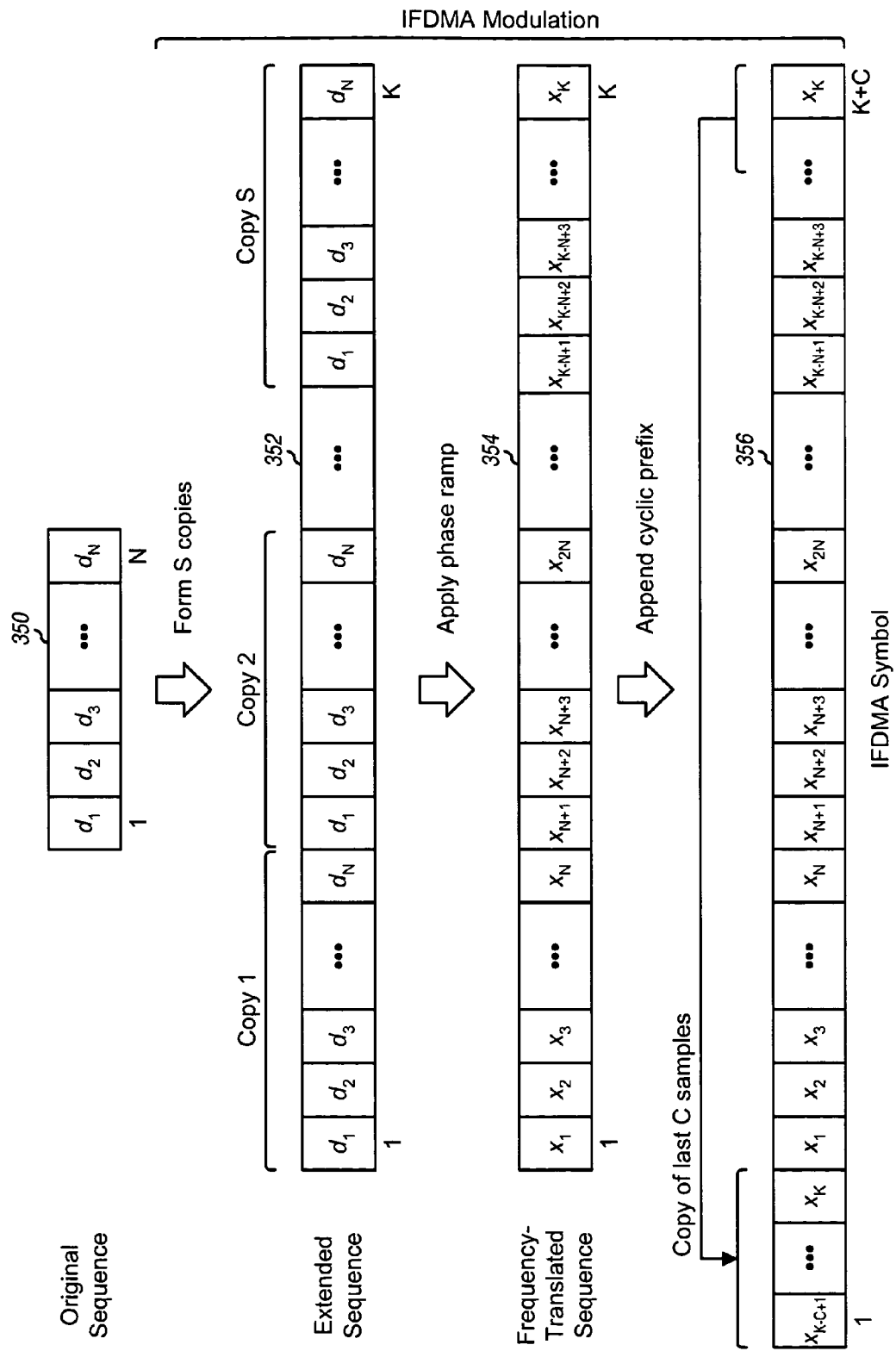
FIG. 3B shows the generation of an IFDMA symbol.

FIG. 3B shows the generation of an IFDMA symbol for one interlace for the case in which N is an integer divisor of K and the N subbands are uniformly distributed across the K total subbands. An original sequence of N modulation symbols to be transmitted in one symbol period on the N subbands in interlace u is denoted as $\{d_1, d_2, d_3, \ldots, d_N\}$ (block 350). The original sequence is replicated S times to obtain an extended sequence of K modulation symbols (block 352). The N modulation symbols are sent in the time domain and collectively occupy N subbands in the frequency domain. The S copies of the original sequence result in the N occupied subbands being spaced apart by S subbands, with S−1 subbands of zero power separating adjacent occupied subbands. The extended sequence has a comb-like frequency spectrum that occupies interlace 1 in FIG. 2A.

The extended sequence is multiplied with a phase ramp to obtain a frequency-translated sequence of K output samples (block 354). Each output sample in the frequency-translated sequence may be generated as follows:

$$x_n = d_n \cdot e^{-j2\pi \cdot (n-1) \cdot (u-1)/K}, \text{ for } n=1, \ldots, K, \qquad \text{Eq (1)}$$

where $d_n$ is the n-th modulation symbol in the extended sequence, $x_n$ the n-th output sample in the frequency-translated sequence, and u is the index of the first subband in the interlace. The multiplication with the phase ramp $e^{-j2\pi \cdot (n-1) \cdot (u-1)/K}$ in the time domain translates the comb-like frequency spectrum for the extended sequence up in frequency so that the frequency-translated sequence occupies interlace u in the frequency domain. The last C output samples of the frequency-translated sequence are copied to the start of the frequency-translated sequence to form an IFDMA symbol that contains K+C output samples (block 356).

An IFDMA symbol is periodic in the time domain (except for the phase ramp) and hence occupies N equally spaced subbands starting with subband u. S IFDMA symbols may be generated with S different subband offsets. These S IFDMA symbols would occupy different interlaces and hence be orthogonal to one another.

The processing shown in FIG. 3A may be used to generate IFDMA, LFDMA and EFDMA symbols for any values of N and K. The processing shown in FIG. 3B may be used to generate IFDMA symbols for the case in which N is an integer divisor of K and the N subbands are uniformly distributed across the K total subbands. The IFDMA symbol generation in FIG. 3B does not require a DFT or an IDFT and may thus be preferred. FIG. 3A may be used to generate IFDMA symbols if N is not an integer divisor of K or if the N subbands are not uniformly distributed across the K subbands. IFDMA, LFDMA and EFDMA symbols may also be generated in other manners.

The K+C output samples of an SC-FDMA symbol (which may be an IFDMA, LFDMA or EFDMA symbol) are transmitted in K+C sample periods, one output sample in each sample period. An SC-FDMA symbol period (or simply, a symbol period) is the duration of one SC-FDMA symbol and is equal to K+C sample periods. A sample period is also called a chip period.

As used generically herein, a subband set is a set of subbands, which may be an interlace for IFDMA, a subband group for LFDMA, or a set of multiple subband groups for EFDMA. For the reverse link, S users may simultaneously transmit data and pilot on the S subband sets (e.g., S interlaces or S subband groups) to a base station without interfering with one another. Multiple users may also share a given subband set, and the base station may use receiver spatial processing to separate out the interfering transmissions on this subband set. For the forward link, the base station may simultaneously transmit data and pilot on the S subband sets to S users without interference.

Figure 4:
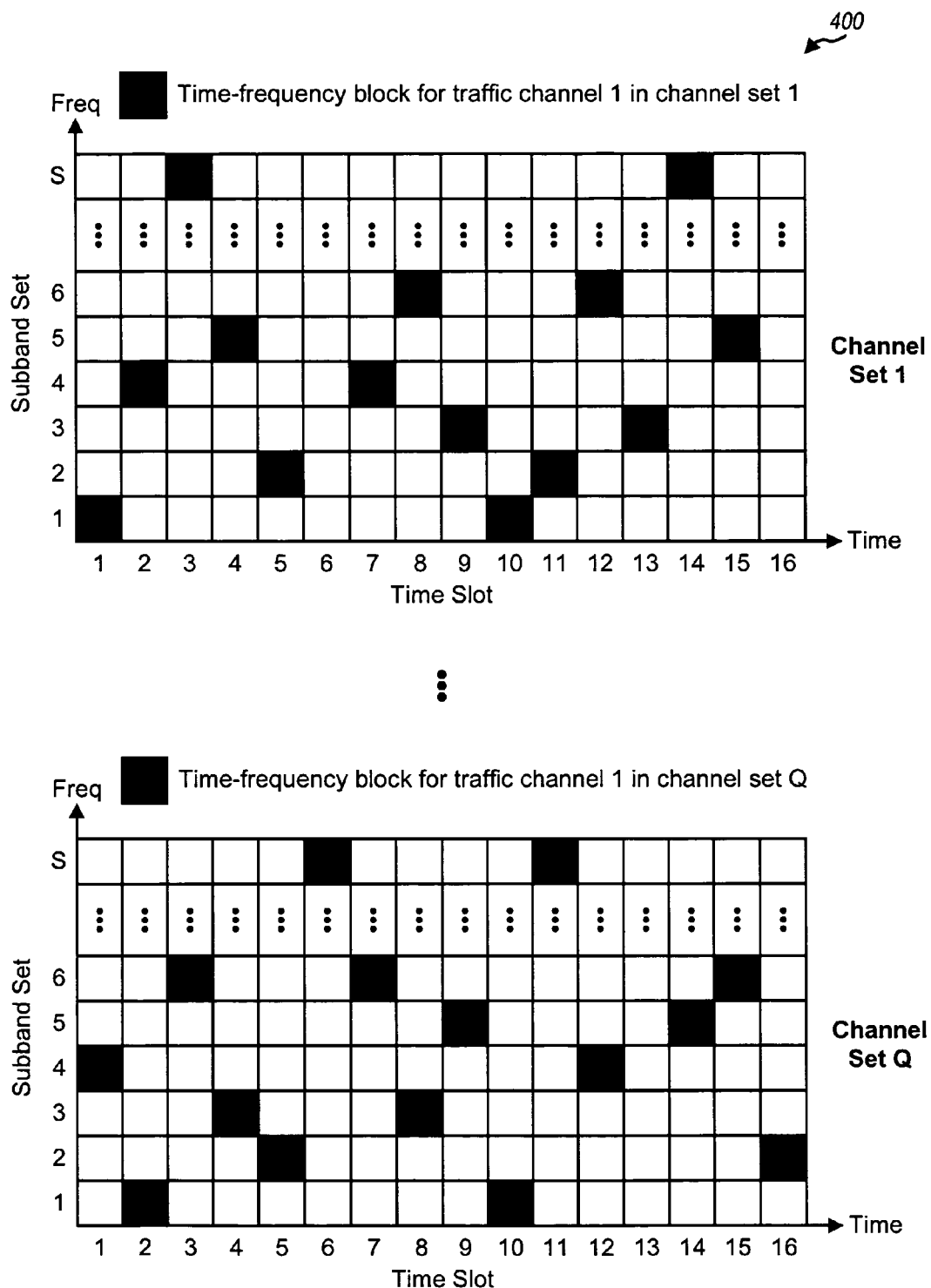
FIG. 4 shows a frequency hopping (FH) scheme.

FIG. 4 shows a frequency hopping (FH) scheme 400 that may be used for the forward and/or reverse link. Frequency hopping can provide frequency diversity and randomization of interference from other cells or sectors. With frequency hopping, a user may be assigned a traffic channel that is associated with a hop pattern that indicates which subband set(s), if any, to use in each time slot. A hop pattern is also called an FH pattern or sequence, and a time slot is also called a hop period. A time slot is the amount of time spent on a given subband set and typically spans multiple symbol periods. The hop pattern may pseudo-randomly select different subband sets in different time slots. Frequency diversity is achieved by selecting all or many of the S subband sets over some number of time slots.

In an embodiment, one channel set is defined for each link. Each channel set contains S traffic channels that are orthogonal to one another so that no two traffic channels map to the same subband set in any given time slot. This avoids intra-cell/sector interference among users assigned to traffic channels in the same channel set. Each traffic channel is mapped to a specific sequence of time-frequency blocks based on the hop pattern for that traffic channel. A time-frequency block is a specific set of subbands in a specific time slot. For this embodiment, up to S users may be assigned the S traffic channels and would be orthogonal to one another. Multiple users may also be assigned the same traffic channel, and these overlapping users would share the same sequence of time-frequency blocks and interfere with each other all the time. In this case, the pilots for the overlapping users may be multiplexed as described below, and the data transmissions for these users may be separated using receiver spatial processing as also described below.

In another embodiment, multiple channel sets may be defined for each link. Each channel set contains S orthogonal traffic channels. The S traffic channels in each channel set may be pseudo-random with respect to the S traffic channels in each of the remaining channel sets. This randomizes interference among users assigned to traffic channels in different channel sets.

FIG. 4 shows an exemplary mapping of traffic channel 1 in each channel set to a sequence of time-frequency blocks. Traffic channels 2 through S in each channel set may be mapped to vertically and circularly shifted versions of the time-frequency block sequence for traffic channel 1. For example, traffic channel 2 in channel set 1 may be mapped to subband set 2 in time slot 1, subband set 5 in time slot 2, subband set 1 in time slot 3, and so on.

In general, multiple users may overlap in a deterministic manner (e.g., by sharing the same traffic channel), a pseudo-random manner (e.g., by using two pseudo-random traffic channels), or a combination of both.

1. Pilot Transmission

With quasi-orthogonal SC-FDMA, multiple transmitters may transmit on a given time-frequency block. The data transmissions from these transmitters may interfere with one another and may be separated using receiver spatial processing even if these data transmissions are not orthogonal to one another. The pilot transmissions from these transmitters may be orthogonalized using TDM, CDM, IFDM, LFDM, or some other multiplexing scheme. The orthogonal pilots improve channel estimation, which may in turn improve data performance since the channel estimates are used to recover the data transmissions. In general, any number of transmitters (e.g., 2, 3, 4, and so on) may share a given time-frequency block. For simplicity, the following description assumes that Q=2, and the pilot transmissions from two transmitters are multiplexed on the same time-frequency block. Also for simplicity, pilots for only IFDMA and LFDMA are described below.

Figure 5:
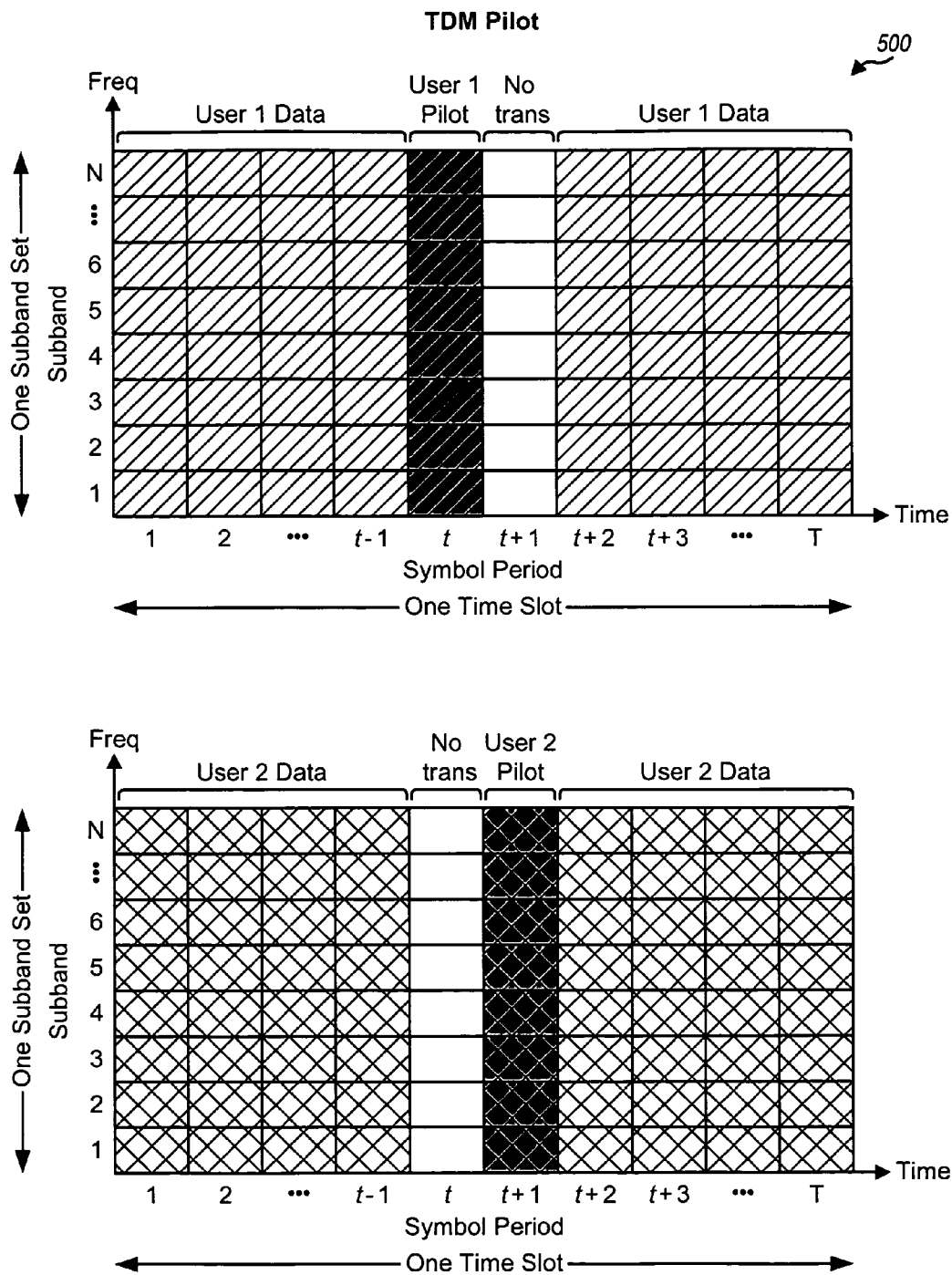
FIG. 5 shows a TDM pilot scheme.

FIG. 5 shows a TDM pilot scheme. Transmitters 1 and 2 transmit data and pilot on the same time-frequency block that is composed of one set of N subbands in one time slot of T symbol periods, where T>1. For the example shown in FIG. 5, transmitter 1 transmits data in symbol periods 1 through t−1, then pilot in symbol period t, and then data in symbol periods t+2 through T. Transmitter 1 does not transmit data or pilot in symbol period t+1. Transmitter 2 transmits data in symbol periods 1 through t−1, then pilot in symbol period t+1, and then data in symbol periods t+2 through T. Transmitter 2 does not transmit data or pilot in symbol period t. The data transmissions from transmitters 1 and 2 interfere with one another. The pilot transmissions from transmitters 1 and 2 do not interfere with one another and hence an improved channel estimate may be derived for each transmitter. Each transmitter may transmit (1) a data SC-FDMA symbol in each symbol period designated for data transmission and (2) a pilot SC-FDMA symbol in each symbol period designated for pilot transmission. A pilot IFDMA symbol may be generated as shown in FIG. 3A or 3B based on a sequence of N pilot symbols. A pilot LFDMA symbol may be generated as shown in FIG. 3A based on a sequence of N pilot symbols.

Figure 6:
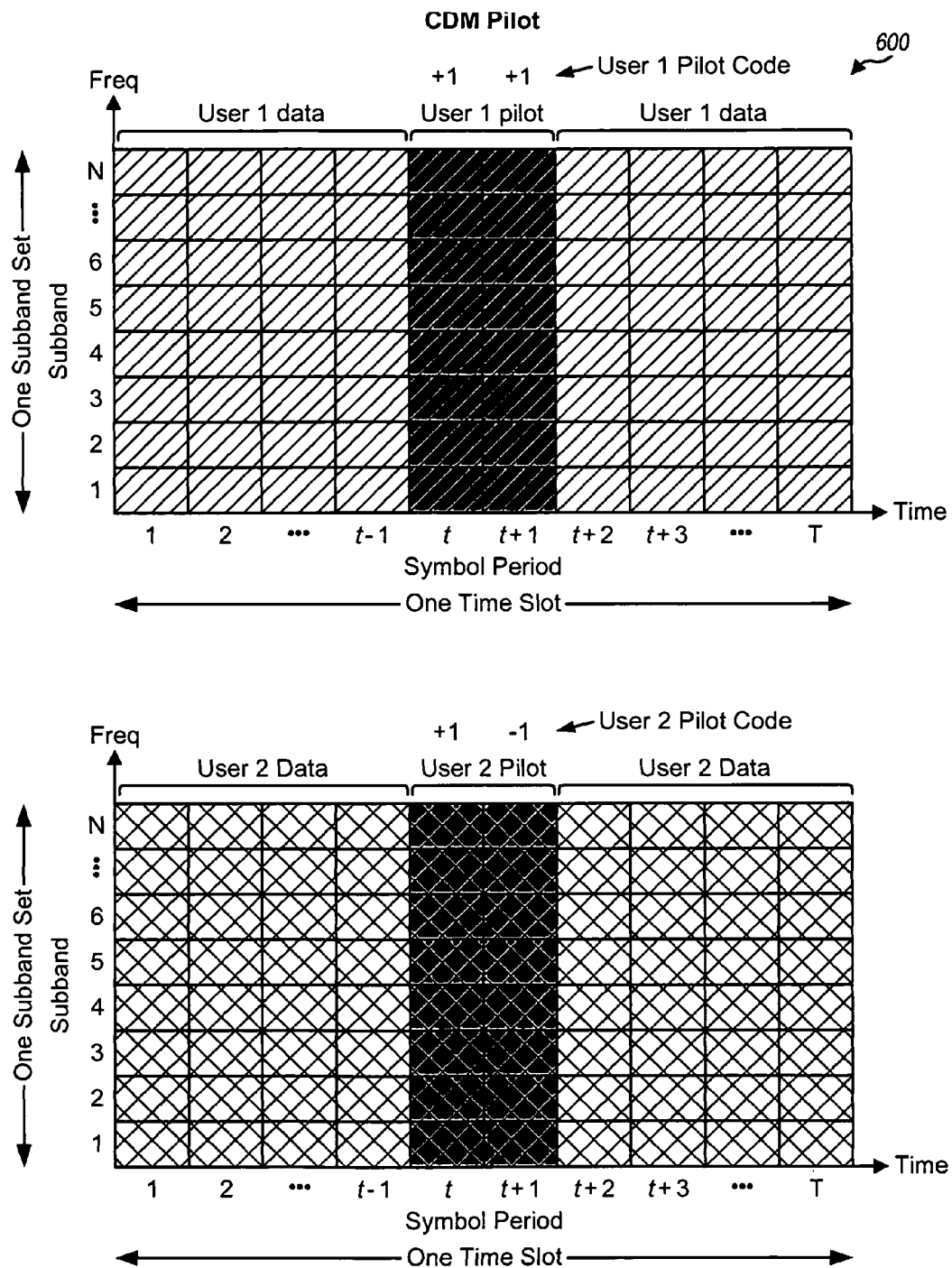
FIG. 6 shows a CDM pilot scheme.

FIG. 6 shows a CDM pilot scheme. For the example shown in FIG. 6, each transmitter transmits data in symbol periods 1 through t−1, then pilot in symbol periods t and t+1, and then data in symbol periods t+2 through T. Transmitters 1 and 2 transmit pilot simultaneously in symbol periods t and t+1. Each transmitter generates a pilot SC-FDMA symbol in the normal manner, e.g., as shown in FIG. 3A or 3B. Transmitter 1 is assigned an orthogonal pilot code of {+1, +1}, multiplies its pilot SC-FDMA symbol with +1 for symbol period t, and multiplies the pilot SC-FDMA symbol with +1 for symbol period t+1. Transmitter 2 is assigned an orthogonal pilot code of {+1, −1}, multiplies its pilot SC-FDMA symbol with +1 for symbol period t, and multiplies the pilot SC-FDMA symbol with −1 for symbol period t+1. The wireless channel is assumed to be static over the two symbol periods used for pilot transmission. The receiver combines the received SC-FDMA symbols for symbol periods t and t+1 to obtain a received pilot SC-FDMA symbol for transmitter 1. The receiver subtracts the received SC-FDMA symbol in symbol period t+1 from the received SC-FDMA symbol in symbol period t to obtain a received pilot SC-FDMA symbol for transmitter 2.

For the embodiments shown in FIGS. 5 and 6, two symbol periods are used for the TDM or CDM pilots from two transmitters. Each transmitter transmits its pilot over one symbol period for the TDM pilot scheme and over two symbol periods for the CDM pilot scheme. Each transmitter may have a certain maximum transmit power level, which may be imposed by regulatory bodies or design limitations. In this case, the CDM pilot scheme allows each transmitter to transmit its pilot over a longer time interval. This allows the receiver to collect more energy for the pilot and derive a higher quality channel estimate for each transmitter.

Figure 7:
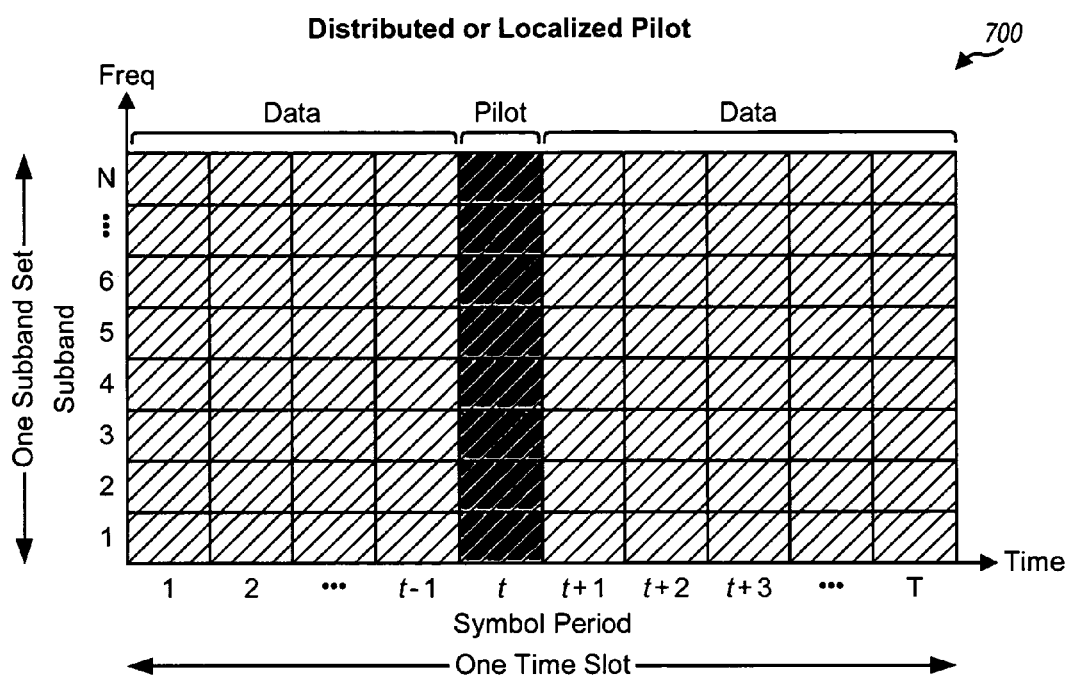
FIG. 7 shows distributed/localized pilot schemes.

FIG. 7 shows distributed/localized pilot schemes. For the example shown in FIG. 7, each transmitter transmits data in symbol periods 1 through t−1, then pilot in symbol period t, and then data in symbol periods t+1 through T. Both transmitters 1 and 2 transmit pilot simultaneously in symbol period t. However, the pilots for transmitters 1 and 2 are multiplexed using IFDM or LFDM, as described below, and do not interfere with each other. As used herein, a distributed pilot is a pilot sent on subbands that are distributed across an interlace or a subband group, and a localized pilot is a pilot sent on adjacent subbands in an interlace or a subband group. Distributed pilots for multiple users may be orthogonally multiplexed in a given interlace or subband group using IFDM. Localized pilots for multiple users may be orthogonally multiplexed in a given interlace or subband group using LFDM.

Figure 8A:
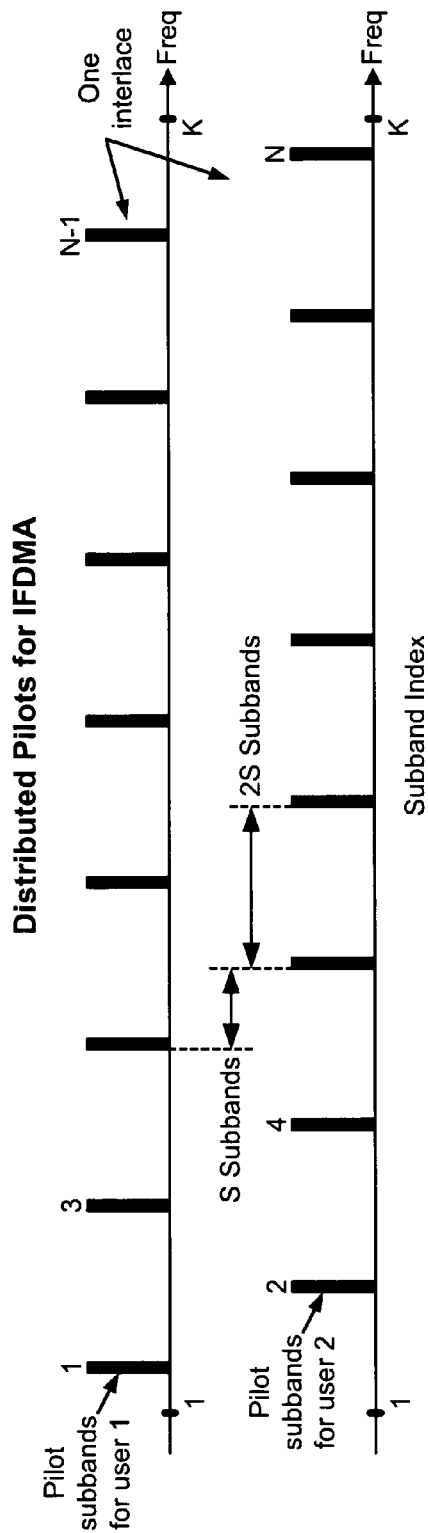
FIG. 8A shows distributed pilots for two transmitters with IFDMA.

FIG. 8A shows distributed pilots for transmitters 1 and 2 with IFDMA, which are also called distributed IFDMA pilots. The N subbands in interlace u are given indices of 1 through N and are partitioned into two subsets. The first subset contains subbands with odd-numbered indices, and the second subset contains subbands with even-numbered indices. The subbands in each subset are spaced apart by 2S subbands, and the subbands in the first subset are offset by S subbands from the subbands in the second subset. Transmitter 1 is assigned the first subset with N/2 subbands, and transmitter 2 is assigned the second subset with N/2 subbands. Each transmitter generates a pilot IFDMA symbol for the assigned subband subset and transmits this IFDMA symbol on the subband subset.

An IFDMA symbol for a distributed pilot may be generated as follows.
1. Form an original sequence of N/2 pilot symbols.
2. Replicate the original sequence 2S times to generate an extended sequence with K pilot symbols.
3. Apply a phase ramp for interlace u as shown in equation (1) to obtain a frequency-translated sequence.
4. Append a cyclic prefix to the frequency-translated sequence to generate the pilot IFDMA symbol.

Figure 8B:
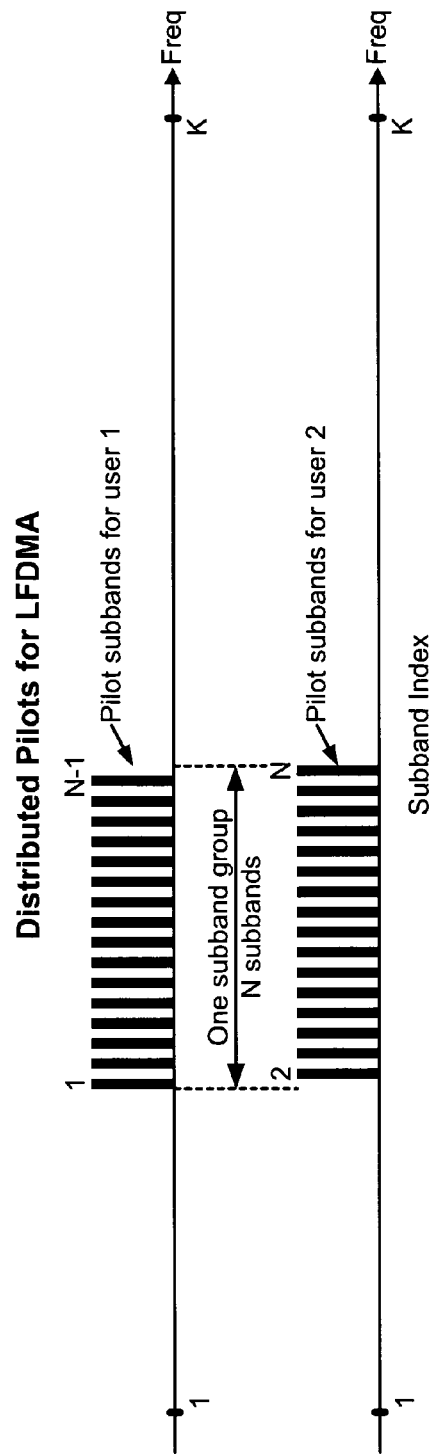
FIG. 8B shows distributed pilots for two transmitters with LFDMA.

FIG. 8B shows distributed pilots for transmitters 1 and 2 with LFDMA, which are also called distributed LFDMA pilots. The N subbands in subband group v are given indices of 1 through N and are partitioned into two subsets. The first subset contains subbands with odd-numbered indices, and the second subset contains subbands with even-numbered indices. The subbands in each subset are spaced apart by two subbands, and the subbands in the first subset are offset by one subband from the subbands in the second subset. Transmitter 1 is assigned the first subset with N/2 subbands, and transmitter 2 is assigned the second subset with N/2 subbands. Each transmitter generates a pilot LFDMA symbol for the assigned subband subset and transmits this LFDMA symbol on the subband subset.

An LFDMA symbol for a distributed pilot may be generated as follows.
1. Form an original sequence of N/2 pilot symbols.
2. Perform a DFT on the N/2 pilot symbols to obtain N/2 frequency-domain values.
3. Map the N/2 frequency-domain values onto the N/2 pilot subbands in the assigned subset and map zero values onto the K−N/2 remaining subbands.
4. Perform a K-point IDFT on the K frequency-domain values and zero values to obtain a sequence of K time-domain output samples.
5. Append a cyclic prefix to the time-domain sequence to generate the pilot LFDMA symbol.

Alternatively, an LFDMA symbol for a distributed pilot may be generated by replicating the original sequence of N/2 pilot symbols to generate an extended sequence of N pilot symbols, which may be processed as described above for FIG. 3A.

As shown in FIGS. 8A and 8B, the distributed pilots for transmitters 1 and 2 occupy different subband subsets and hence do not interfere with one another. The receiver performs the complementary processing to recover the distributed pilot from each transmitter, as described below.

Figure 9A:
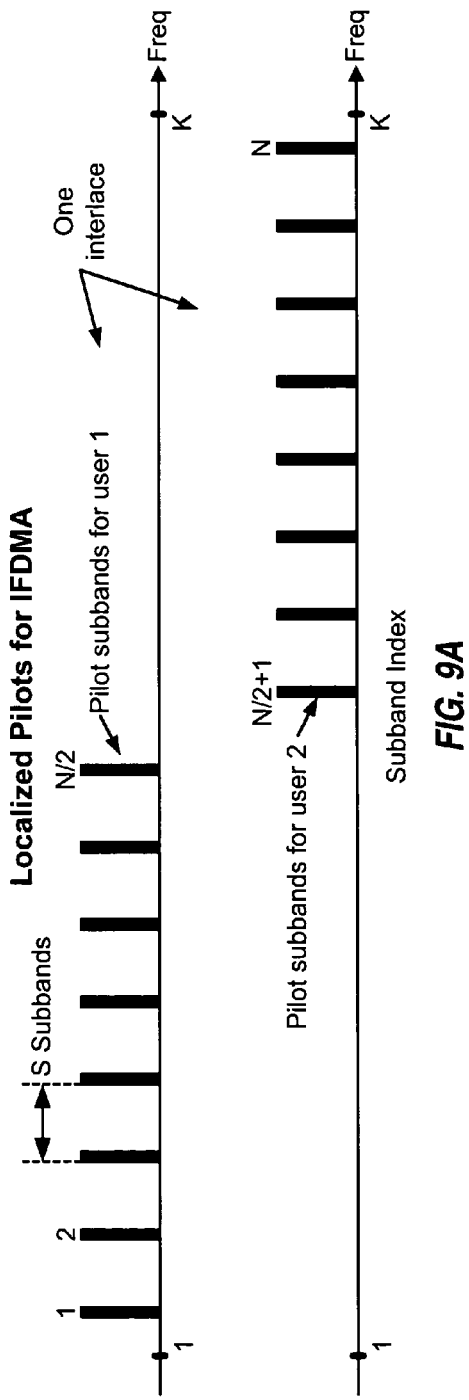
FIG. 9A shows localized pilots for two transmitters with IFDMA.

FIG. 9A shows localized pilots for transmitters 1 and 2 with IFDMA, which are also called localized IFDMA pilots. The N subbands in interlace u are given indices of 1 through N and are partitioned into two subsets. The first subset contains subbands 1 through N/2 in the lower half of the system bandwidth, and the second subset contains subbands N/2+1 through N in the upper half of the system bandwidth. The subbands in each subset are spaced apart by S subbands. Transmitter 1 is assigned the first subset with N/2 subbands, and transmitter 2 is assigned the second subset with N/2 subbands. Each transmitter generates a pilot IFDMA symbol for the assigned subband subset and transmits this IFDMA symbol on the subband subset.

An IFDMA symbol for a localized pilot may be generated as follows.
1. Form an original sequence of N/2 pilot symbols.
2. Replicate the original sequence S times to generate an extended sequence with K/2 pilot symbols.
3. Perform a DFT on the K/2 pilot symbols to obtain K/2 frequency-domain values. N/2 frequency-domain values are non-zero and the remaining frequency-domain values are zero because of the repetition by S.
4. Map the K/2 frequency-domain values such that the N/2 non-zero frequency-domain values are sent on the N/2 pilot subbands in the assigned subset.
5. Map zero values onto the remaining subbands.
6. Perform a K-point IDFT on the K frequency-domain values and zero values to obtain a sequence of K time-domain output samples.
7. Append a cyclic prefix to the time-domain sequence to generate the pilot IFDMA symbol.

Steps 3 through 6 above are similar to the steps performed to generate an LFDMA symbol that is allocated K/2 subbands out of the K total subbands.

Figure 9B:
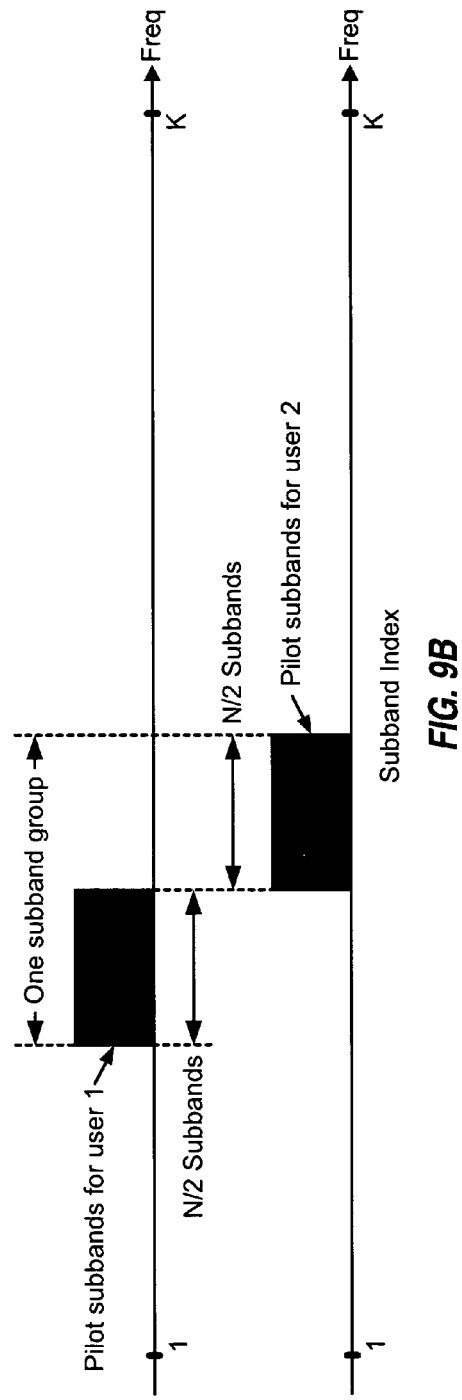
FIG. 9B shows localized pilots for two transmitters with LFDMA.

FIG. 9B shows localized pilots for transmitters 1 and 2 with LFDMA, which are also called localized LFDMA pilots. The N subbands in subband group v are given indices of 1 through N and are partitioned into two subsets. The first subset contains subbands 1 through N/2 in the lower half of the subband group, and the second subset contains subbands N/2+1 through N in the upper half of the subband group. The subbands in each subset are adjacent to one another. Transmitter 1 is assigned the first subset with N/2 subbands, and transmitter 2 is assigned the second subset with N/2 subbands. Each transmitter generates a pilot LFDMA symbol for its subband subset and transmits this LFDMA symbol on the subband subset.

An LFDMA symbol for a localized pilot may be generated as follows.

1. Form an original sequence of N/2 pilot symbols.
2. Perform a DFT on the N/2 pilot symbols to obtain N/2 frequency-domain values.
3. Map the N/2 frequency-domain values onto the N/2 pilot subbands in the assigned subset and map zero values onto the K−N/2 remaining subbands.
4. Perform a K-point IDFT on the K frequency-domain values and zero values to obtain a sequence of K time-domain output samples.
5. Append a cyclic prefix to the time-domain sequence to generate the pilot LFDMA symbol.

Steps 1 through 5 above are for generation of an LFDMA symbol that is allocated N/2 subbands out of the K total subbands.

For clarity, exemplary methods of generating distributed pilots with IFDMA and LFDMA and generating localized pilots with IFDMA and LFDMA have been described above. The distributed and localized pilots may also be generated in other manners. Distributed and localized pilots may also be generated for EFDMA, e.g., in manners similar to that described above for IFDMA and LFDMA.

FIGS. 8A through 9B show a case in which Q=2 and each transmitter is assigned N/2 subbands for pilot transmission. In general, the N subbands in a given time-frequency block may be allocated to the Q users in any manner. The Q users may be allocated the same number of subbands or different numbers of subbands. Each user may be allocated N/Q subbands if Q is an integer divisor of N or approximately N/Q subbands if Q is not an integer divisor of N. For example, if N=16 and Q=3, then three transmitters may be allocated 5, 5, and 6 subbands. The pilot IFDMA symbol or pilot LFDMA symbol for each transmitter may be generated as shown in FIG. 3A using DFT-based construction.

The pilot subbands may be a subset of the data subbands, as described above for FIGS. 8A through 9B. In general, the pilot subbands may or may not be a subset of the data subbands. Furthermore, the pilot subbands may have the same or different (e.g., wider) frequency spacing than the data subbands.

In the description above, the data and pilot SC-FDMA symbols have the same duration, and each data SC-FDMA symbol and each pilot SC-FDMA symbol are transmitted in K+C sample periods. Data and pilot SC-FDMA symbols of different durations may also be generated and transmitted.

Figure 10:
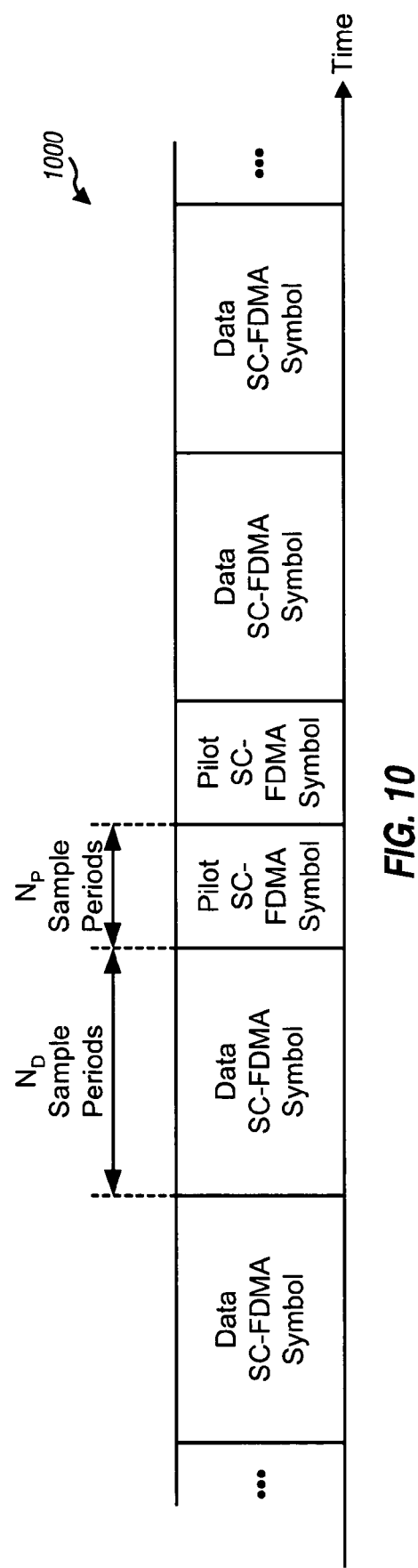
FIG. 10 shows a transmission with different data and pilot symbol durations.

FIG. 10 shows a transmission scheme 1000 with different data and pilot symbol durations. For transmission scheme 1000, each data SC-FDMA symbol is composed of $N_D$ output samples that are transmitted in $N_D$ sample periods, and each pilot SC-FDMA symbol is composed of $N_P$ output samples that are transmitted in $N_P$ sample periods, where $N_D>1$, $N_P>1$ and $N_D \ne N_P$. For example, $N_D$ may be equal to K+C, and $N_P$ may be equal to K/2+C, K/4+C, and so on. As a specific example, K may be equal to 512, C may be equal to 32, $N_D$ may be equal to K+C=544, and $N_P$ may be equal to K/2+C=288. Each data SC-FDMA symbol may be a data IFDMA symbol that may be generated as shown in FIG. 3A or 3B, a data LFDMA symbol that may be generated as shown in FIG. 3A, or a data EFDMA symbol that may be generated as shown in FIG. 3A.

As an example, a pilot SC-FDMA symbol may be half the duration of a data SC-FDMA symbol (not counting the cyclic prefix). In this case, there are K/2 total "wider" subbands for the pilot, with each wider subband having twice the width of a "normal" subband for the traffic data.

For a shortened LFDMA symbol, a subband group is composed of N/2 wider subbands that are assigned indices of 1 through N/2. Transmitter 1 may be assigned a first subset of N/4 wider subbands with even-numbered indices, and transmitter 2 may be assigned a second subset of N/4 wider subbands with odd-numbered indices. A shortened LFDMA symbol for a distributed pilot may be generated as follows.

1. Form an original sequence of N/4 pilot symbols.
2. Perform a DFT on the N/4 pilot symbols to obtain N/4 frequency-domain values.
3. Map the N/4 frequency-domain values onto the N/4 wider subbands in the assigned subset and map zero values onto the remaining wider subbands.
4. Perform a K/2-point IDFT on the K/2 frequency-domain values and zero values to obtain a sequence of K/2 time-domain output samples.
5. Append a cyclic prefix to the time-domain sequence to generate the shortened pilot LFDMA symbol.

For LFDMA, the pilot and data from transmitters 1 and 2 are sent on the same subband group. The N/2 wider pilot subbands occupy the same portion of the system bandwidth as the N normal data subbands. For IFDMA, there is no direct mapping between the wider pilot subbands and the normal data subbands for a given interlace. N wider pilot subbands may be formed with two interlaces and allocated to four transmitters assigned to these two interlaces. Each of the four transmitters may be assigned N/4 wider pilot subbands that are uniformly spaced across the system bandwidth. Each transmitter may generate a shortened IFDMA symbol for a distributed pilot, e.g., as described above for the shortened pilot LFDMA symbol, except that the N/4 frequency-domain values are mapped to different wider pilot subbands.

Transmission scheme 1000 may be used to reduce the amount of overhead for pilot. For example, a single pilot symbol period with a duration that is shorter than a data symbol period may be allocated for pilot transmission. Transmission scheme 1000 may also be used in combination with CDM. Multiple (L) pilot symbol periods with shorter duration may be allocated for pilot transmission, where L is the length of the orthogonal code used for the CDM pilot.

For clarity, the TDM, CDM, distributed and localized pilot schemes have been specifically described above for a simple case with two transmitters. In general, these pilot schemes may be used for any number of transmitters. For the TDM pilot scheme, Q transmitters may be assigned Q different symbol periods used for pilot transmission, and each transmitter may transmit its pilot on its assigned symbol period. For the CDM pilot scheme, Q transmitters may be assigned Q different orthogonal codes for pilot transmission, and each transmitter may transmit its pilot using its assigned orthogonal code. For a distributed IFDMA pilot, an interlace may be partitioned into Q subsets, with each subset containing approximately N/Q subbands that may be uniformly distributed across the K total subbands and spaced apart by Q·S subbands. For a distributed LFDMA pilot, a subband group may be partitioned into Q subsets, with each subset containing approximately N/Q subbands that may be spaced apart by Q subband. For a localized IFDMA pilot, an interlace may be partitioned into Q subsets, with each subset containing approximately N/Q subbands that may be distributed across K/Q subbands and spaced apart by S subbands. For a localized LFDMA pilot, a subband group may be partitioned into Q subsets, with each subset containing approximately N/Q adjacent subbands. In general, Q may or may not be an integer divisor of N, and each transmitter may be assigned any number of subbands and any one of the subbands in a given subband set. For the distributed and localized pilot schemes, each transmitter may transmit its pilot on its assigned subset of subbands.

The pilot symbols used to generate a pilot SC-FDMA symbol may be selected from a modulation scheme such as M-PSK, M-QAM, and so on. The pilot symbols may also be derived based on a polyphase sequence, which is a sequence that has good temporal characteristics (e.g., a constant time-domain envelope) and good spectral characteristics (e.g., a flat frequency spectrum). For example, the pilot symbols may be generated as follows:

$$p_n = e^{j\varphi_n}, \text{ for } n=1,\ldots,P, \quad \text{Eq (2)}$$

where P is the number of pilot symbols. P is equal to N for the TDM and CDM pilot schemes shown in FIGS. 5 and 6, respectively, and is equal to N/2 for the exemplary distributed and localized pilot schemes shown in FIGS. 8A through 9B. The phase $\varphi_n$ may be derived based on any one of the following:

$$\varphi_n = \pi \cdot (n-1) \cdot n, \quad \text{Eq (3)}$$

$$\varphi_n = \pi \cdot (n-1)^2, \quad \text{Eq (4)}$$

$$\varphi_n = \pi \cdot [(n-1) \cdot (n-P-1)], \quad \text{Eq (5)}$$

$$\varphi_n = \begin{cases} \pi \cdot (n-1)^2 \cdot Q'/P & \text{for } P \text{ even,} \\ \pi \cdot (n-1) \cdot n \cdot Q'/P & \text{for } P \text{ odd.} \end{cases} \quad \text{Eq (6)}$$

In equation (6), Q' and P are relatively prime. Equation (3) is for a Golomb sequence, equation (4) is for a P3 sequence, equation (5) is for a P4 sequence, and equation (6) is for a Chu sequence. The P3, P4 and Chu sequences can have any arbitrary length.

The pilot symbols may also be generated as follows:

$$p_{(l-1) \cdot T+m} = p_{l,m} = e^{j\varphi_{l,m}}, \text{ for } l=1,\ldots,T \text{ and } m=1,\ldots,T. \quad \text{Eq (7)}$$

The phase $\varphi_{l,m}$ may be derived based on any one of the following:

$$\varphi_{l,m} = 2\pi \cdot (l-1) \cdot (m-1)/T, \quad \text{Eq (8)}$$

$$\varphi_{l,m} = -(\pi/T) \cdot (T-2l+1) \cdot [(l-1) \cdot T + (m-1)], \quad \text{Eq (9)}$$

$$\varphi_{l,m} = \begin{cases} (\pi/T) \cdot (T-2l+1) \cdot [(T-1)/2 - (m-1)] & \text{for } T \text{ even,} \\ (\pi/T) \cdot (T-2l+1) \cdot [(T-2)/2 - (m-1)] & \text{for } T \text{ odd.} \end{cases} \quad \text{Eq (10)}$$

Equation (8) is for a Frank sequence, equation (9) is for a P1 sequence, and equation (10) is for a Px sequence. The lengths for the Frank, P1 and Px sequences are constrained to be $P=T^2$, where T is a positive integer.

Figure 11:
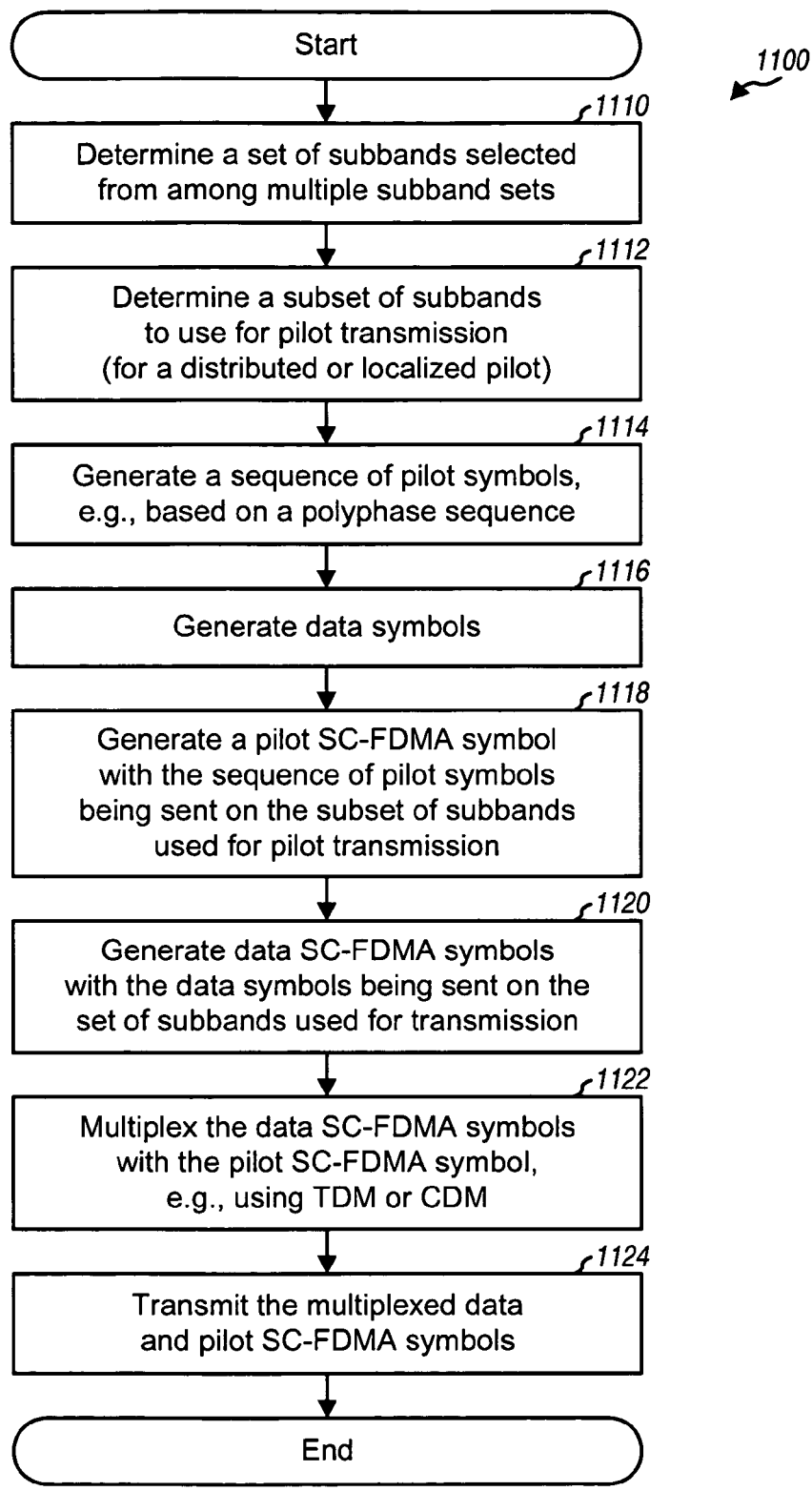
FIG. 11 shows a process to transmit pilot and data in the Q-FDMA system.

FIG. 11 shows a process 1100 performed by a transmitter to transmit pilot and data in the Q-FDMA system. A set of N subbands selected from among the S subband sets is determined (block 1110). This subband set may contain (1) data subbands to be used for data transmission or (2) pilot subbands to be shared by multiple transmitters for pilot transmission. For a distributed or localized pilot, a subset of P subbands assigned for pilot transmission, which is selected from among the Q subband subsets formed with the assigned subband set, is determined (block 1112). For a TDM or CDM pilot, the subset of subbands assigned for pilot transmission is equal to the set of subbands assigned for transmission, and P=N. For a distributed or localized pilot, Q>1 and P may be equal to N/Q. The subband set and subband subset may be defined in different manners depending on (1) whether a distributed or localized pilot is being transmitted, (2) whether IFDMA, LFDMA, EFDMA, or hybrid IFDMA/LFDMA/EFDMA is used by the system, (3) whether the data and pilot SC-FDMA symbols have the same or different durations, and so on. Blocks 1110 and 1112 may be performed for each time slot if the Q-FDMA system utilizes frequency hopping.

A sequence of pilot symbols is generated, e.g., based on a polyphase sequence (block 1114). This sequence typically contains one pilot symbol for each subband used for pilot transmission. For example, the sequence may contain N pilot symbols for a TDM or CDM pilot with N pilot subbands or N/2 pilot symbols for a distributed or localized pilot with N/2 pilot subbands. Data symbols are also generated in the normal manner (block 1116).

A pilot SC-FDMA symbol is generated with the sequence of pilot symbols and such that these pilot symbols occupy the subbands used for pilot transmission (block 1118). Data SC-FDMA symbols are generated with the data symbols and such that these data symbols occupy the subbands used for transmission (block 1120). For a CDM pilot, multiple scaled pilot SC-FDMA symbols are generated based on the pilot SC-FDMA symbol and an orthogonal code assigned to the transmitter. The data SC-FDMA symbols are multiplexed with the pilot SC-FDMA symbol, e.g., using TDM as shown in FIG. 5 or 7 or using CDM as shown in FIG. 6 (block 1122). The multiplexed data and pilot SC-FDMA symbols are transmitted on the assigned time-frequency block (block 1124).

2. Channel Estimation

Referring back to FIG. 1, at receiver 150, a channel estimator for each receive antenna 152 estimates the channel response between each transmitter and that receive antenna. Multiple (Q) transmitters may share the same time-frequency block and may multiplex their pilots using TDM, CDM, IFDM or LFDM, as described above. Each channel estimator performs the complementary demultiplexing and derives a channel estimate for each of the Q transmitters sharing this time-frequency block.

Figure 12:
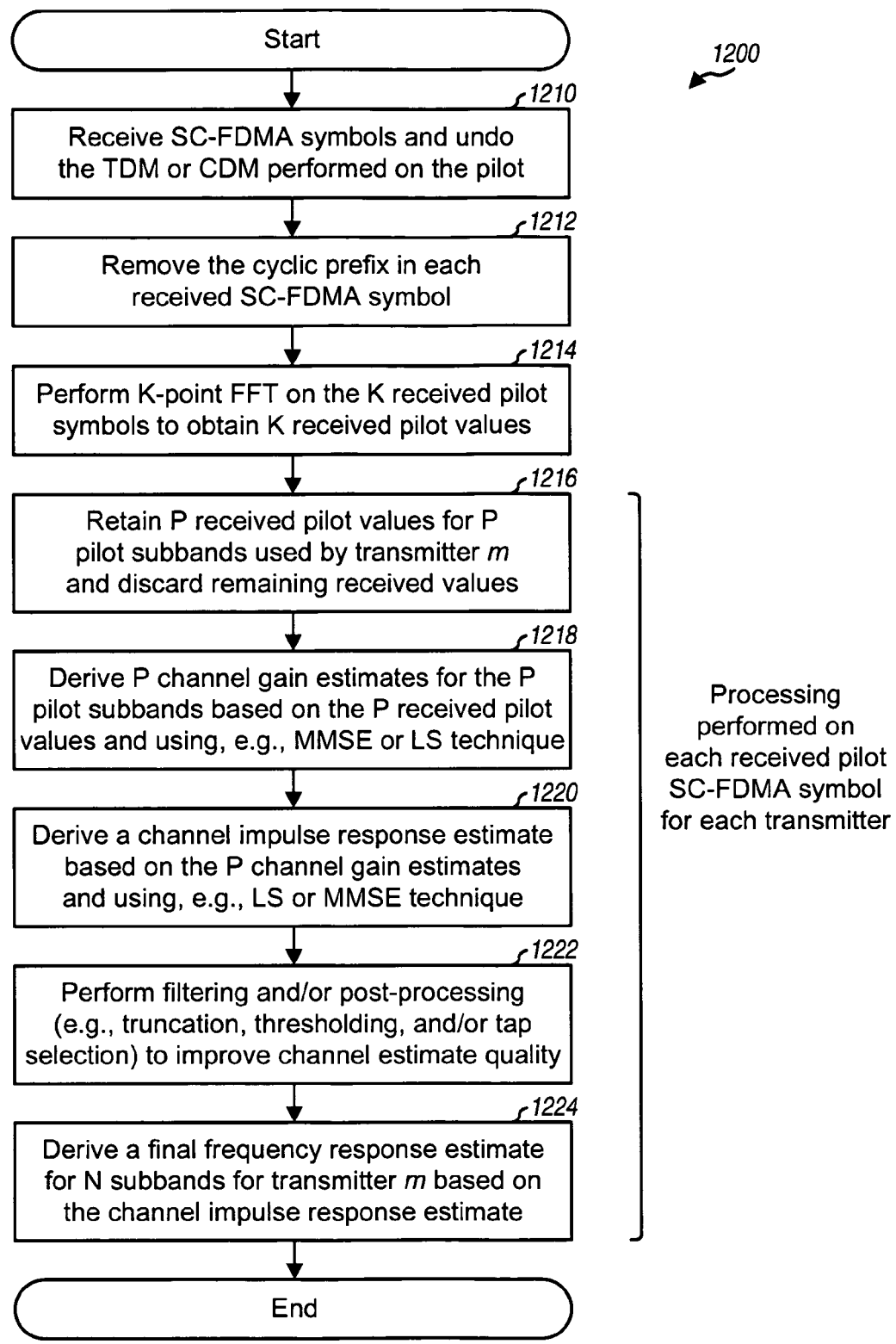
FIG. 12 shows a process for performing channel estimation.

FIG. 12 shows a process 1200 performed by a channel estimator for one receive antenna to estimate the response of the wireless channel for each transmitter based on the pilot received from that transmitter. For clarity, channel estimation for one time-frequency block shared by Q transmitters is described below.

The channel estimator receives an SC-FDMA symbol for the associated antenna in each symbol period and undoes the TDM or CDM performed for the pilot (block 1210). For the TDM pilot scheme shown in FIG. 5, Q received pilot SC-FDMA symbols are obtained in Q symbol periods from the Q transmitters, and the received pilot SC-FDMA symbol for each transmitter is processed to derive a channel estimate for that transmitter. For the CDM pilot scheme shown in FIG. 6, Q received SC-FDMA symbols containing the CDM pilots from the Q transmitters are multiplied with Q orthogonal codes assigned to these transmitters and accumulated to obtain Q received pilot SC-FDMA symbols for the Q transmitters. For the distributed and localized pilot schemes shown in FIGS. 7 through 9B, one received pilot SC-FDMA symbol may be obtained in one symbol period for the Q transmitters, and the received pilot SC-FDMA symbol is processed to derive a channel estimate for each of the Q transmitters.

The channel estimator removes the cyclic prefix in each received SC-FDMA symbol and obtains K input samples for that received SC-FDMA symbol (block 1212). The channel estimator then performs a K-point DFT on the K input samples for each received SC-FDMA symbol and obtains K frequency-domain received values for that received SC-FDMA symbol (block 1214). The channel estimator performs channel estimation on received pilot values obtained from the received pilot SC-FDMA symbol(s). The channel estimator also provides to RX spatial processor 160 received data values obtained from the received data SC-FDMA symbols. For clarity, channel estimation for one transmitter m is described below.

The pilots from the Q transmitters are orthogonal to one another due to use of TDM, CDM, IFDM or LFDM. The received pilot values for transmitter m may be given as:

$$R_r^p(k)=H_{m,r}(k) \cdot P_m(k)+N_r(k), \text{ for } k \in K_p, \quad \text{Eq (11)}$$

where
- $P_m(k)$ is a pilot value sent by transmitter m on subband k;
- $H_{m,r}(k)$ is a complex gain for the wireless channel between transmitter m and receive antenna r for subband k;
- $R_r^p(k)$ is a received pilot value from receive antenna r for subband k;
- $N_r(k)$ is the noise on receive antenna r for subband k, and
- $K_p$ is the subset of P pilot subbands.

For simplicity, the noise may be assumed to be additive white Gaussian noise (AWGN) with zero mean and a variance of $N_0$.

The K-point DFT in block 1214 provides K received values for the K total subbands. Only P received pilot values for the P pilot subbands used by transmitter m are retained, and the remaining K−P received values are discarded (block 1216). P is equal to N for the TDM and CDM pilot schemes and is equal to N/Q for the distributed and localized pilot schemes. Different pilot subbands are used for the TDM, CDM, distributed and localized pilot schemes and hence different received pilot values are retained for different pilot schemes. Furthermore, different pilot subbands are used by different transmitters for the distributed and localized pilot schemes and hence different received pilot values are retained for different transmitters.

The channel estimator may estimate the channel frequency response for transmitter m using various channel estimation techniques such as an MMSE technique, a least-squares (LS) technique, and so on. The channel estimator derives P channel gain estimates for the P pilot subbands used by transmitter m based on the P received pilot values for these subbands and using the MMSE or LS technique (block 1218). For the MMSE technique, an initial frequency response estimate may be derived based on the received pilot values, as follows:

$$\hat{H}_{m,r}^{mmse}(k) = \frac{R_r^p(k) \cdot P^*(k)}{|P(k)|^2 + N_0}, \text{ for } k \in K_p, \quad \text{Eq (12)}$$

where $\hat{H}_{m,r}^{mmse}(k)$ is a channel gain estimate between transmitter m and receive antenna r for subband k and "*" denotes a complex conjugate. For the LS technique, an initial frequency response estimate may be derived as follows:

$$\hat{H}_{m,r}^{ls}(k) = \frac{R_r^p(k)}{P(k)}, \text{ for } k \in K_p. \quad \text{Eq (13)}$$

The initial frequency response estimate contains P channel gains for the P pilot subbands. The impulse response of the wireless channel may be characterized by L taps, where L may be less than P. A channel impulse response estimate for transmitter m may be derived based on the P channel gain estimates and using a least-squares (LS) technique or an MMSE technique (block 1220). A least-squares channel impulse response estimate with L taps, $\hat{h}_{m,r}^{ls}(n)$ for n=1, . . . , L, may be derived based on the initial frequency response estimate, as follows:

$$\underline{\hat{h}}_{L \times 1}^{ls} = (\underline{W}_{P \times L}^H \underline{W}_{P \times L})^{-1} \underline{W}_{P \times L}^H \underline{\hat{H}}_{P \times 1}^{init}, \quad \text{Eq (14)}$$

where
- $\underline{\hat{H}}_{P \times 1}^{init}$ is an P×1 vector containing $\hat{H}_{m,r}^{ls}(k)$ or $\hat{H}_{m,r}^{mmse}(k)$ for k∈K';
- $\underline{W}_{P \times L}$ is a sub-matrix of a Fourier matrix $\underline{W}_{K \times K}$;
- $\underline{\hat{h}}_{L \times 1}^{ls}$ is an L×1 vector containing $\hat{h}_{m,r}^{ls}(n)$ for n=1, . . . , L; and
- "H" denotes a conjugate transpose.

The Fourier matrix $\underline{W}_{K \times K}$ is defined such that the (u,v)-th entry, $f_{u,v}$ is given as:

$$f_{u,v} = e^{-j2\pi \frac{(u-1)(v-1)}{K}}, \text{ for } u = 1, \ldots, K \text{ and } v = 1, \ldots, K, \quad \text{Eq (15)}$$

$\underline{W}_{P \times L}$ contains P rows of $\underline{W}_{K \times K}$ corresponding to the P pilot subbands. Each row of $\underline{W}_{P \times L}$ contains the first L elements of the corresponding row of $\underline{W}_{K \times K}$. $\underline{\hat{h}}_{L \times 1}^{ls}$ contains the L taps of the least-squares channel impulse response estimate.

An MMSE channel impulse response estimate with L taps, $\hat{h}_{m,r}^{mmse}(k)$ for n=1, . . . , L, may be derived as follows:

$$\underline{\hat{h}}_{L \times 1}^{mmse} = (\underline{W}_{P \times L}^H \underline{W}_{P \times L} + \underline{N}_{L \times L})^{-1} \underline{W}_{P \times L}^H \underline{\hat{H}}_{P \times 1}^{init}, \quad \text{Eq (16)}$$

where $\underline{N}_{L \times L}$ is an L×L autocovariance matrix of noise and interference. For AWGN, $\underline{N}_{L \times L}$ may be given as $\underline{N}_{L \times L} = N_0 \cdot \underline{I}$, where $N_0$ is the noise variance. A P-point IDFT may also be performed on the initial frequency response estimate to obtain a channel impulse response estimate with P taps.

The channel estimator may perform filtering and/or post-processing on the initial frequency response estimate and/or the channel impulse response estimate to improve the quality of the channel estimate (block 1222). The filtering may be based on a finite impulse response (FIR) filter, an infinite impulse response (IIR) filter, or some other type of filter. In an embodiment, truncation may be performed to retain only the first L taps of the channel impulse response estimate and to replace the remaining taps with zeros. In another embodiment, thresholding may be performed to zero out channel taps having low energy below a predetermined threshold. The threshold may be computed based on the energy of all P taps or just the first L taps of the channel impulse response estimate. In yet another embodiment, tap selection may be performed to retain B best channel taps and zero out remaining channel taps.

The channel estimator may derive a final frequency response estimate for the N subbands in the time-frequency block by (1) zero-padding the L-tap or P-tap channel impulse response estimate to length N and (2) performing an N-point DFT on the extended impulse response estimate (block 1224). The channel estimator may also derive a final frequency response estimate for the N subbands by (1) interpolating the P channel gain estimates, (2) performing least-squares approximation on the P channel gain estimates, or (3) using other approximation techniques.

A frequency response estimate and/or a channel impulse response estimate for the wireless channel may also be obtained in other manners using other channel estimation techniques.

3. Spatial Multiplexing

Referring back to FIG. 1, a single-input multiple-output (SIMO) channel is formed between the single antenna at each transmitter 110 and the R antennas at receiver 150. The SIMO channel for transmitter m, for m=1, ..., M, may be characterized by an R×1 channel response vector $\underline{h}_m(k,t)$ for each subband, which may be expressed as:

$$\underline{h}_m(k,t) = \begin{bmatrix} h_{m,1}(k,t) \\ h_{m,2}(k,t) \\ \vdots \\ h_{m,R}(k,t) \end{bmatrix}, \quad \text{Eq (17)}$$

where $h_{m,r}(k,t)$, for r=1, ..., R, is the coupling or complex channel gain between the single antenna at transmitter 110m and the R antennas at receiver 150 for subband k in time slot t. A different SIMO channel is formed between each transmitter and the receiver. The channel response vectors for the M transmitters 110a through 110m may be denoted as $\underline{h}_1(k,t)$ through $\underline{h}_M(k,t)$, respectively.

If the number of transmitters selected for transmission (M) is less than or equal to the number of traffic channels in one channel set (or M≤S), then the M transmitters may be assigned different traffic channels in one channel set. If the number of transmitters is greater than the number of traffic channels in one channel set (or M>S), then these transmitters may be assigned traffic channels from the smallest number of channel sets. The minimum number of channel sets (Q) needed to support M transmitter may be given as Q=⌈M/S⌉, where "⌈x⌉" denotes a ceiling operator that provides an integer value that is equal to or greater than x. If multiple (Q) channel sets are used for M transmitters, then each transmitter observes interference from at most Q−1 other transmitters at any given moment and is orthogonal to at least M−(Q−1) other transmitters.

For the Q-FDMA system, up to Q transmitters may share a given time-frequency block. For a frequency-hopping Q-FDMA system, a given transmitter transmits on different subband sets in different time slots and shares time-frequency blocks with different transmitters over time due to the pseudo-random nature of frequency hopping. For simplicity, the following description is for one time-frequency block shared by transmitters 1 through Q.

A multiple-input multiple-output (MIMO) channel is formed between the Q transmitters sharing the same time-frequency block and receiver 150. The MIMO channel may be characterized by an R×Q channel response matrix $\underline{H}(k,t)$ for each subband in the time-frequency block, which may be expressed as:

$$\underline{H}(k,t) = [\underline{h}_1(k,t)\ \underline{h}_2(k,t) \ldots \underline{h}_Q(k,t)], \text{ for } k \in K_d, \quad \text{Eq (18)}$$

where $K_d$ is the set of subbands for the time-frequency block. In general, each transmitter may be equipped with one or multiple antennas. A multi-antenna transmitter may transmit different SC-FDMA symbol streams from multiple antennas and would then have one channel response vector in $\underline{H}(k,t)$ for each transmit antenna. These multiple transmissions from the multi-antenna transmitter may be treated in the same way as multiple transmissions from multiple single-antenna transmitters.

Each of the Q transmitters may transmit data and pilot using IFDMA, LFDMA, or EFDMA. Receiver 150 processes the input samples from the R receive antennas and obtains received data values. The received data values for each subband k in each symbol period n of time slot t may be expressed as:

$$\underline{r}(k,t,n) = \underline{H}(k,t) \cdot \underline{x}(k,t,n) + \underline{n}(k,t,n), \text{ for } k \in K_d, \quad \text{Eq (19)}$$

where $\underline{x}(k,t,n)$ is a Q×1 vector with Q data values sent by the Q transmitters on subband k in symbol period n of time slot t;

$\underline{r}(k,t,n)$ is an R×1 vector with R received data values obtained via the R receive antennas for subband k in symbol period n of time slot t; and $\underline{n}(k,t,n)$ is a noise vector for subband k in symbol period n of time slot t.

For simplicity, the channel response matrix $\underline{H}(k,t)$ is assumed to be constant for the entire time slot and is not a function of symbol period n.

N transmit vectors, $\underline{x}(k,t,n)$ for $k \in K_d$, are formed by the Q transmitters for the N subbands in each symbol period n of time slot t. Each vector $\underline{x}(k,t,n)$ contains Q data values sent by the Q transmitters on subband k in symbol period n of time slot t.

N receive vectors, $\underline{r}(k,t,n)$ for $k \in K_d$, are obtained for the N subbands in each symbol period n of each time slot t. Each vector $\underline{r}(k,t,n)$ contains R received data values obtained via the R antennas at receiver 150 for one subband in one symbol period. For a given subband k, symbol period n, and time slot t, the j-th data value in the vector $\underline{x}(k,t,n)$ is multiplied by the j-th vector/column of the channel response matrix $\underline{H}(k,t)$ to generate a vector $\underline{r}_j(k,t,n)$. The Q data values in $\underline{x}(k,t,n)$, which are sent by Q different transmitters, are multiplied by the Q columns of $\underline{H}(k,t)$ to generate Q vectors $\underline{r}_1(k,t,n)$ through $\underline{r}_Q(k,t,n)$, one vector for each transmitter. The vector $\underline{r}(k,t,n)$ obtained by receiver 150 is composed of a linear combination of the Q vectors $\underline{r}_1(k,t,n)$ through $\underline{r}_Q(k,t,n)$, or $$\underline{r}(k,t,n) = \sum_{j=1}^{Q} \underline{r}_j(k,t,n).$$

Each received data value in $\underline{r}(k,t,n)$ thus contains a component of each of the Q transmitted data values in $\underline{x}(k,t,n)$. The Q data values sent simultaneously by the Q transmitters on each subband k in each symbol period n of time slot t thus interfere with one another at receiver 150.

Receiver 150 may use various receiver spatial processing techniques to separate out the data transmissions sent simultaneously by the Q transmitters on each subband in each symbol period. These receiver spatial processing techniques include a zero-forcing (ZF) technique, an MMSE technique, and a maximal ratio combining (MRC) technique.

Receiver 150 may derive a spatial filter matrix based on the ZF, MMSE, or MRC technique, as follows:

$$\underline{M}_{zf}(k,t) = [\underline{H}^H(k,t) \cdot \underline{H}(k,t)]^{-1} \cdot \underline{H}^H(k,t), \quad \text{Eq (20)}$$

$$\underline{M}_{mmse}(k,t) = \underline{D}_{mmse}(k,t) \cdot [\underline{H}^H(k,t) \cdot \underline{H}(k,t) + \sigma^2 \cdot \underline{I}]^{-1} \cdot \underline{H}^H(k,t), \quad \text{Eq (21)}$$

$$\underline{M}_{mrc}(k,t) = \underline{D}_{mrc}(k,t) \cdot \underline{H}^H(k,t), \quad \text{Eq (22)}$$

where $\underline{D}_{mmse}(k,t) = \text{diag}\{[\underline{H}^H(k,t) \cdot \underline{H}(k,t) + \sigma^2 \cdot \underline{I}]^{-1} \cdot \underline{H}^H(k,t) \cdot \underline{H}(k,t)\}^{-1}$; and $\underline{D}_{mrc}(k,t) = \text{diag}[\underline{H}^H(k,t) \cdot \underline{H}(k,t)]^{-1}$.

Receiver 150 may estimate the channel response matrix $\underline{H}(k,t)$ for each subband based on the pilots received from the Q transmitters. For clarity, the description herein assumes no channel estimation error. Receiver 150 then uses the estimated channel response matrix $\underline{H}(k,t)$ to derive the spatial filter matrix. Because $\underline{H}(k,t)$ is assumed to be constant across time slot t, the same spatial filter matrix may be used for all symbol periods in time slot t.

Receiver 150 may perform receiver spatial processing as follows:

$$\hat{\underline{x}}(k,t,n) = \underline{M}(k,t) \cdot \underline{r}(k,t,n), \qquad \text{Eq (23)}$$
$$= \underline{x}(k,t,n) + \underline{\tilde{n}}(k,t,n),$$

where
$\underline{M}(k,t)$ may be equal to $\underline{M}_{zf}(k,t)$, $\underline{M}_{mmse}(k,t)$, or $\underline{M}_{mrc}(k,t)$;
$\hat{\underline{x}}(k,t,n)$ is an L×1 vector with L detected data values for subband k in symbol period n of time slot t; and
$\underline{\tilde{n}}(k,t,n)$ is the noise after the receiver spatial processing.
A detected data value is an estimate of a transmitted data value.

The estimates from the MMSE spatial filter $\underline{M}_{mmse}(k,t)$ and the MRC spatial filter $\underline{M}_{mrc}(k,t)$ are unnormalized estimates of the data values in $\underline{x}(k,t,n)$. The multiplication with the scaling matrix $\underline{D}_{mmse}(k,t)$ or $\underline{D}_{mrc}(k,t)$ provides normalized estimates of the data values.

In general, different sets of transmitters may be assigned different subband sets in a given time slot, e.g., as determined by their hop patterns. The S sets of transmitters assigned to the S subband sets in a given time slot may contain the same or different numbers of transmitters. Furthermore, each transmitter set may contain single-antenna transmitters, multi-antenna transmitters, or a combination of both. Different sets of transmitters may also be assigned to a given subband set in different time slots. The channel response matrix $\underline{H}(k,t)$ for each subband in each time slot is determined by the set of transmitters using that subband in that time slot and contains one or more vectors/columns for each transmitter transmitting on that subband in that time slot. The matrix $\underline{H}(k,t)$ may contain multiple vectors for a transmitter using multiple antennas to transmit different streams to receiver 150.

As shown above, the multiple data transmissions sent simultaneously by the Q transmitters on each subband k in each symbol period n of each time slot t may be separated by receiver 150 based on their spatial signatures, which are given by their channel response vectors $\underline{h}_m(k,t)$. This allows the Q-FDMA system to enjoy higher capacity.

Q-FDMA may be used for the forward and reverse links. For the reverse link, multiple terminals may transmit simultaneously on the same time-frequency block to a multi-antenna base station, which may separate the transmissions from these terminals using the receiver spatial processing techniques described above. For the forward link, the multi-antenna base station may obtain channel estimates for all terminals (e.g., based on pilots transmitted by these terminals) and perform transmitter spatial processing for the transmissions sent to these terminals. For example, the base station may perform transmitter spatial processing for terminal m, as follows:

$$\underline{x}_m(k,t,n) = \underline{h}^*_m(k,t) \cdot s_m(k,t,n), \text{ for } k \in K_d, \qquad \text{Eq (24)}$$

where
$s_m(k,t,n)$ is a data symbol to be sent to terminal m on subband k in symbol period n of time slot t; and
$\underline{x}_m(k,t,n)$ is an R×1 vector with R transmit symbols to be sent via the R antennas to terminal m on subband k in symbol period n of time slot t.

Equation (24) shows transmitter spatial processing using MRC beamforming. The base station may also perform other type of transmitter spatial processing. For example, the base station may transmit to two users simultaneously using zero-forcing beamforming and may form a beam for the first user such that the other user lies in the null of this beam and observes no interference from the first user.

On the forward link, a multi-antenna terminal may receive transmissions from multiple base stations. Each base station may transmit to the terminal using a different hop pattern assigned to the terminal by that base station. The hop patterns assigned by different base stations to the terminal may collide. Whenever this occurs, the terminal may use receiver spatial processing to separate out the multiple transmissions sent simultaneously on the same subband in the same symbol period by these base stations.

Q-FDMA may also be used to improve performance during handoff. A terminal A may be handed off from base station 1 to base station 2. During handoff, base station 2 may receive a transmission from terminal A on subbands that overlap with the subbands assigned to another terminal B communicating with base station 2. Base station 2 may perform receiver spatial processing to separate the transmissions from terminals A and B. Base station 1 or 2 may also combine information (e.g., detected data values) obtained by the two base stations for terminal A, which is a process known as "softer handoff", to improve performance. Base stations 1 and 2 may also send orthogonal pilots to terminal A. The network may be designed such that the pilots for the forward link and/or reverse link in different sectors are orthogonal to one another.

Orthogonal pilots may be sent on the forward and reverse links to facilitate channel estimation. Multiple terminals sharing the same time-frequency block may send orthogonal pilots to a given base station. Multiple base stations may also send orthogonal pilots to a given terminal, e.g., during handoff. The orthogonal pilots may be sent using any of the pilot transmission schemes described herein.

4. H-ARQ Transmission

The Q-FDMA system may employ hybrid automatic repeat request (H-ARQ), which is also called incremental redundancy (IR) transmission. With H-ARQ, a transmitter sends one or multiple transmissions for a data packet until the packet is decoded correctly by the receiver or the maximum number of transmissions has been sent. H-ARQ improves reliability for data transmission and supports rate adaptation for packets in the presence of changes in channel conditions.

Figure 13:
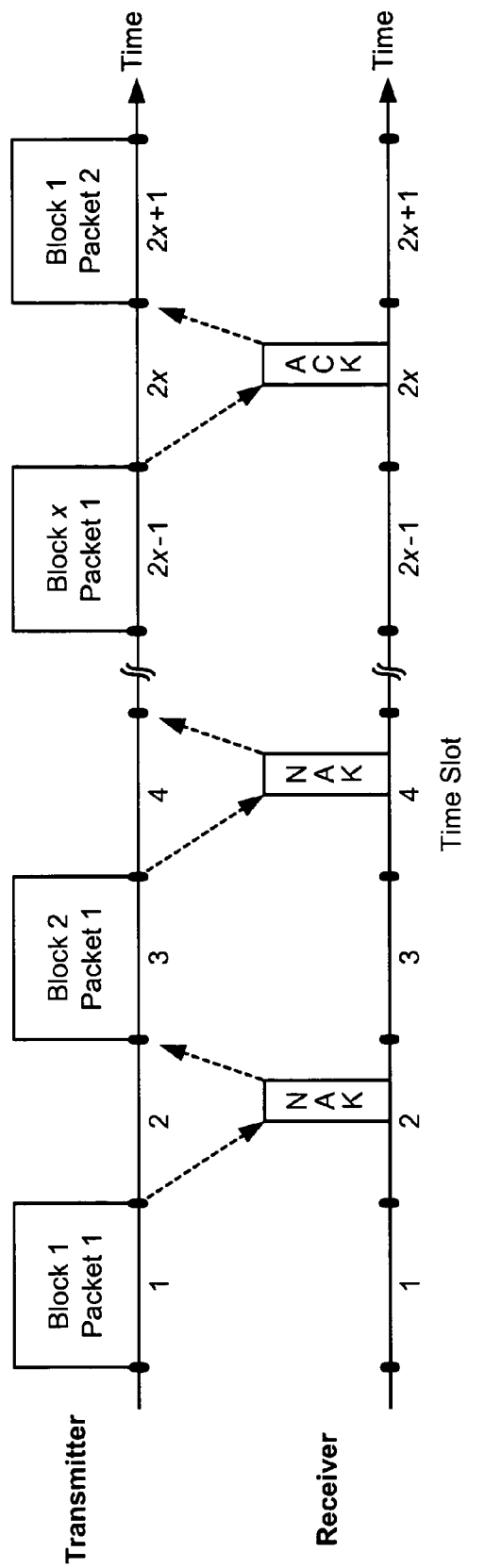
FIG. 13 shows an H-ARQ transmission.

FIG. 13 shows an H-ARQ transmission. A transmitter processes (e.g., encodes and modulates) a data packet (Packet 1) and generates multiple (B) data blocks, which may also be called frames or subpackets. Each data block may contain sufficient information to allow the receiver to correctly decode the packet under favorable channel conditions. The B data blocks contain different redundancy information for the packet. Each data block may be sent in any number of time slots. For the example shown in FIG. 13, each data block is sent in one time slot.

The transmitter transmits the first data block (Block 1) for Packet 1 in time slot 1. The receiver receives and processes (e.g., demodulates and decodes) Block 1, determines that Packet 1 is decoded in error, and sends a negative acknowledgment (NAK) to the transmitter in time slot 2. The transmitter receives the NAK and transmits the second data block (Block 2) for Packet 1 in time slot 3. The receiver receives Block 2, processes Blocks 1 and 2, determines that Packet 1 is still decoded in error, and sends a NAK in time slot 4. The block transmission and NAK response may continue any number of times. For the example shown in FIG. 13, the transmitter transmits data block x (Block x) for Packet 1 in time slot t, where x≤B. The receiver receives Block x, processes Blocks 1 through x for Packet 1, determines that the packet is decoded correctly, and sends back an ACK in time slot 2b. The transmitter receives the ACK and terminates the transmission of Packet 1. The transmitter processes the next data packet (Packet 2) and transmits the data blocks for Packet 2 in similar manner.

In FIG. 13, there is a delay of one time slot for the ACK/NAK response for each block transmission. To improve channel utilization, the transmitter may transmit multiple packets in an interlaced manner. For example, the transmitter may transmit one packet in odd-numbered time slots and another packet in even-numbered time slots. More than two packets may also be interlaced for a longer ACK/NAK delay.

FIG. 13 shows transmission of both NAKs and ACKs. For an ACK-based scheme, an ACK is sent only if a packet is decoded correctly, and NAKs are not sent and presumed by the absence of ACKs.

Figure 14:
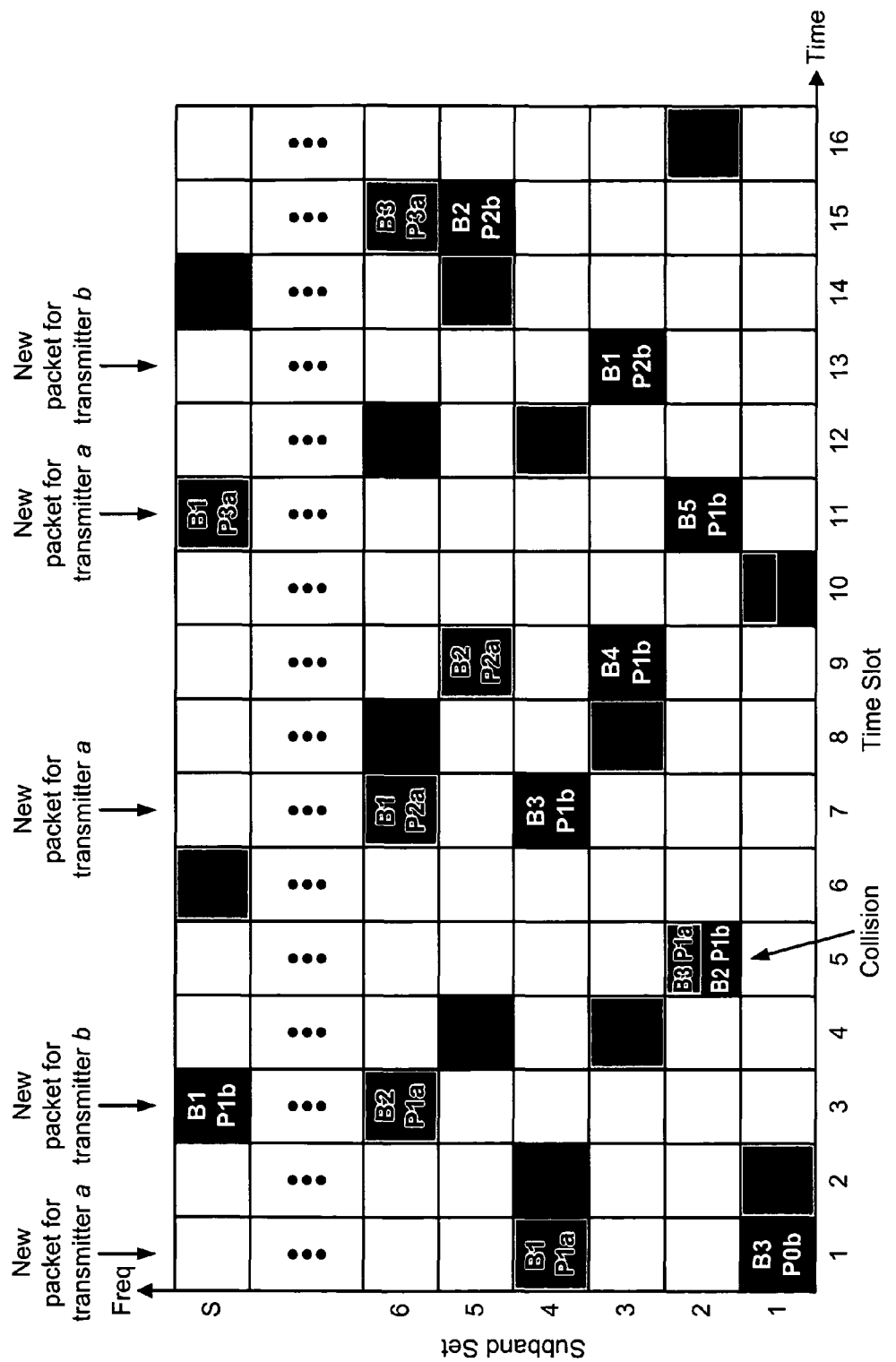
FIG. 14 shows H-ARQ transmissions for two transmitters.

FIG. 14 shows H-ARQ transmissions for two transmitters a and b with frequency hopping. Each transmitter may transmit a new packet starting in any time slot. Each transmitter may also transmit any number of data blocks for each packet and may transmit another packet upon receiving an ACK for the current packet. The packets transmitted by each transmitter thus appear asynchronous with respect to the packets transmitted by the other transmitters. With frequency hopping, each transmitter transmits on a sequence of time-frequency blocks. Each transmitter may interfere with other transmitters in a pseudo-random manner if these transmitters are assigned traffic channels in different channel sets, as shown in FIG. 14. Multiple transmitters may also interfere with one another in each time-frequency block if they are assigned the same traffic channel (not shown in FIG. 14).

The receiver receives the block transmissions from the transmitters and performs receiver spatial processing for each time-frequency block with block transmissions from multiple transmitters. The receiver demodulates and decodes each packet based on all data symbol estimates obtained for all block transmissions received for that packet. For each packet that is decoded correctly, the H-ARQ transmission for that packet may be terminated, and the interference due to that packet may be estimated and subtracted from the input samples or the received data values for the time-frequency block(s) used by that packet. The interference estimate may be obtained, e.g., by encoding and modulating the packet in the same manner performed by the transmitter and multiplying the resultant symbols with the channel estimates for the packet. The receiver may perform receiver spatial processing on the interference-canceled symbols for all time-frequency blocks used by the correctly decoded packets to obtain new data symbol estimates for packets that are decoded in error and transmitted on the same time-frequency blocks as the correctly decoded packets. Each packet decoded in error and overlapping at least partially (i.e., sharing any time-frequency block) with any correctly decoded packet may be demodulated and decoded based on all data symbol estimates for that packet.

5. Transmitter and Receiver

Figure 15:
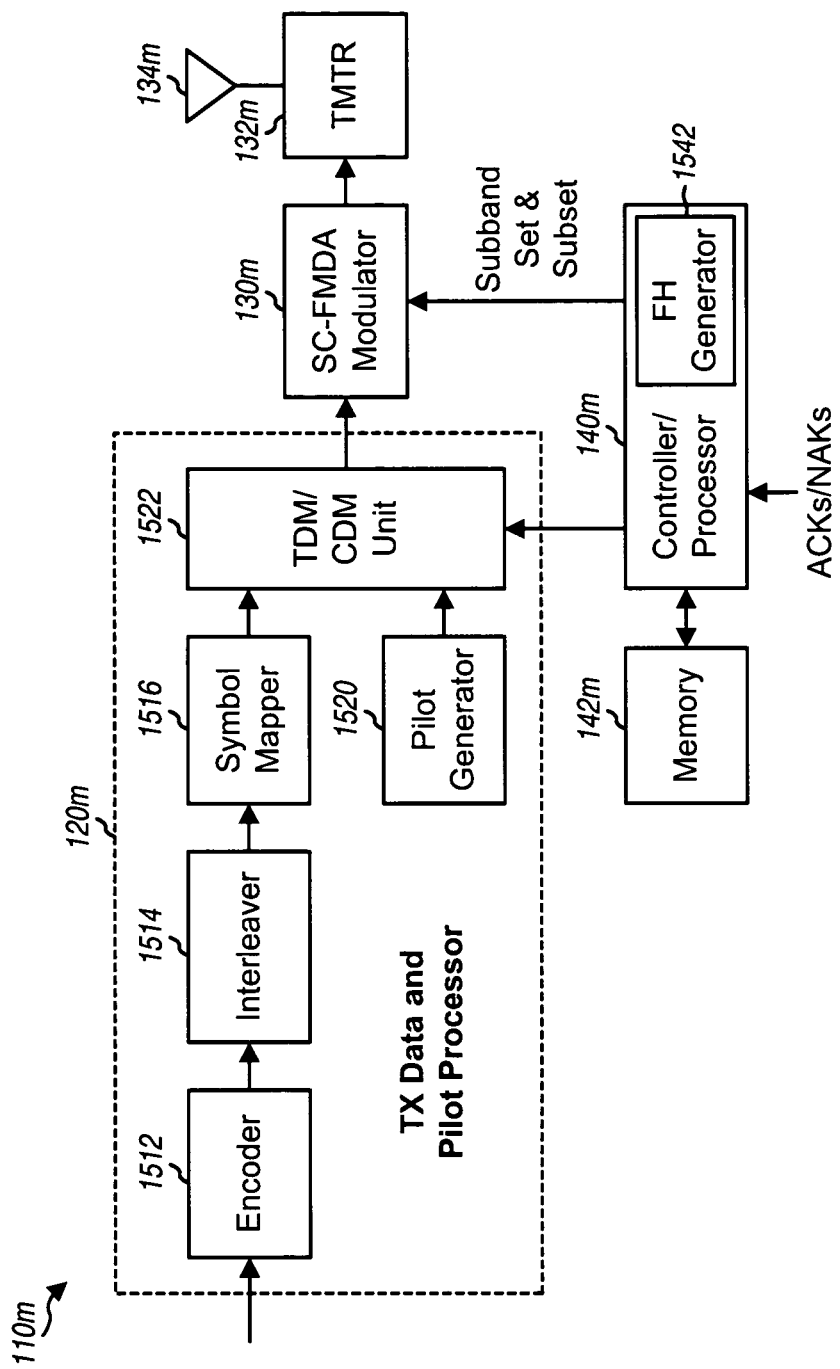
FIG. 15 shows a block diagram of a transmitter.

FIG. 15 shows an embodiment of transmitter 110m. Within TX data and pilot processor 120m, an encoder 1512 receives traffic data, encodes each data packet based on a coding scheme to generate a coded packet, and partitions each coded packet into multiple data blocks. An interleaver 1514 interleaves or reorders each data block based on an interleaving scheme. A symbol mapper 1516 maps the interleaved bits in each data block to data symbols based on a modulation scheme. A pilot generator 1520 generates pilot symbols, e.g., based on a polyphase sequence. A TDM/CDM unit 1522 multiplexes the data symbols with the pilot symbols using TDM (e.g., as shown in FIG. 5 or 7) or CDM (e.g., as shown in FIG. 6). The data and pilot symbols may also be multiplexed after the SC-FDMA modulation.

Within controller/processor 140m, an FH generator 1542 determines the set of subbands to use for transmission in each time slot, e.g., based on a hop pattern assigned to transmitter 110m. For distributed and localized pilots, controller/processor 140m also determines the subset of subbands to use for pilot transmission. For example, the transmitters assigned traffic channels in channel set 1 may be assigned the first subset, the transmitters assigned traffic channels in channel set 2 may be assigned the second subset, and so on. SC-FDMA modulator 130m generates data SC-FDMA symbols such that the data symbols are sent on the set of subbands used for transmission. SC-FDMA modulator 130m also generates pilot SC-FDMA symbols such that pilot symbols are sent on the subset of subbands used for pilot transmission.

Figure 16:
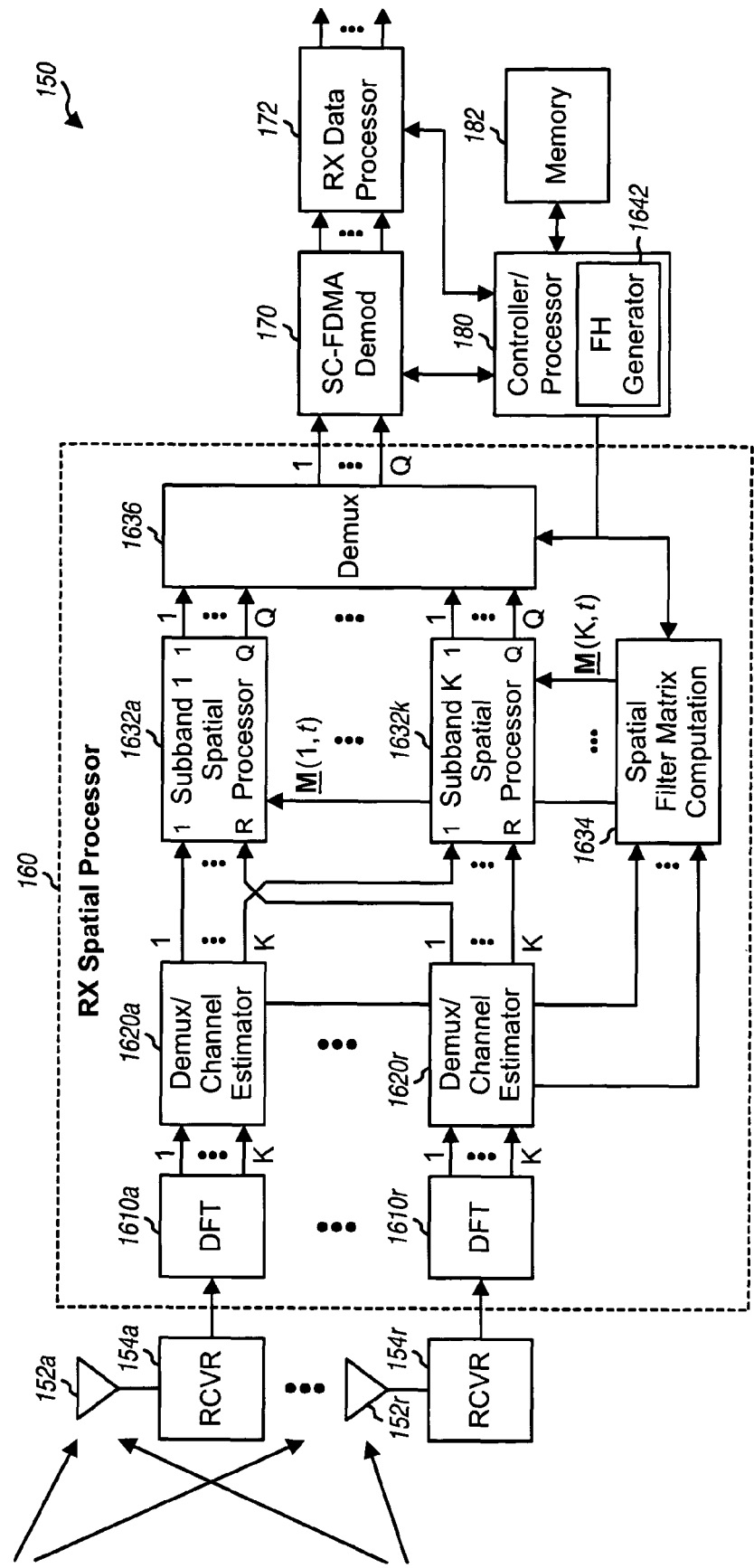
FIG. 16 shows a block diagram of a receiver.

FIG. 16 shows an embodiment of receiver 150. At receiver 150, R DFT units 1610a through 1610r receive the input samples from receiver units 154a through 154r, respectively, for the R receive antennas. Each DFT unit 1610 performs a DFT on the input samples for each symbol period to obtain frequency-domain values for that symbol period. R demultiplexers/channel estimators 1620a through 1620r receive the frequency-domain values from DFT units 1610a through 1610r, respectively. Each demultiplexer 1620 provides frequency-domain values for data (or received data values) to K subband spatial processors 1632a through 1632k.

Each channel estimator 1620 derives a channel estimate for each transmitter based on frequency-domain values for pilot (or received pilot values) obtained for that transmitter. A spatial filter matrix computation unit 1634 forms a channel response matrix $\underline{H}(k,t)$ for each subband in each time slot based on the channel response vectors for all transmitters using that subband and time slot. Computation unit 1634 then derives a spatial filter matrix $\underline{M}(k,t)$ for each subband of each time slot based on the channel response matrix $\underline{H}(k,t)$ for that subband and time slot, as described above. Computation unit 1634 provides K spatial filter matrices for the K subbands in each time slot.

K subband spatial processors 1632a through 1632k obtain received data values for subbands 1 through K, respectively, from demultiplexers 1620a through 1620r. Each subband spatial processor 1632 also receives the spatial filter matrix for its subband, performs receiver spatial processing on the received data values with the spatial filter matrix, and provides detected data values. For each symbol period, K spatial processors 1632a through 1632k provide K vectors of detected data values for the K subbands to a demultiplexer (Demux) 1636. Demultiplexer 1636 maps the detected data values for each transmitter onto detected SC-FDMA symbols. A detected SC-FDMA symbol for a given transmitter m is an SC-FDMA symbol that is obtained by receiver 150 for that transmitter with the interference from the other transmitters suppressed via the receiver spatial processing.

SC-FDMA demodulator 170 processes each detected SC-FDMA symbol and provides data symbol estimates to RX data processor 172. SC-FDMA demodulator 170 may perform equalization, removal of the phase ramp for IFDMA, demapping of the symbols from the assigned subbands, and so on. SC-FDMA demodulator 170 also maps the data symbol estimates for the M transmitters onto M streams based on the traffic channels assigned to these transmitters. An FH generator 1642 determines the subbands used by each transmitter based on the hop pattern assigned to that transmitter.

RX data processor 172 symbol demaps, deinterleaves, and decodes the data symbol estimates for each transmitter and provides the decoded data as well as the decoding status for each decoded packet. Controller 180 may generate ACKs and/or NAKs based on the decoding status and may send the ACKs and/or NAKs back to the transmitters to control the transmission of data blocks for H-ARQ.

The techniques described herein may be implemented by various means. For example, these techniques may be implemented in hardware, software, or a combination thereof. For a hardware implementation, the processing units used to perform pilot transmission, channel estimation, receiver spatial processing, and so on may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 142 or 182 in FIG. 1) and executed by a processor (e.g., controller 140 or 180). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a first processor adapted to
arrange a total number of available subbands into a plurality of predetermined sets of subbands that collectively constitute the total number of available subbands,
partition a set of subbands among the plurality of sets of subbands into a plurality of subsets of the set of subbands, wherein each of said subsets contains at least two subbands;
generate a first sequence of pilot symbols for transmission in a subset of the set of subbands among the plurality of subsets of the set of subbands, the first sequence of pilot symbols being orthogonal to and configured to interlace with a second sequence of pilot symbols generated in a second processor for transmission in a further subset of the set of subbands among the plurality of subsets of the set of subbands, wherein at least one of the pilot symbols of the first sequence is generated for transmission simultaneously on the at least two subbands of the associated subset, and
generate a first sequence of data symbols, the first sequence of data symbols being non-orthogonal to a second sequence of data symbols generated in the second processor; and
a transmitter coupled to the first processor for transmitting the first sequence of pilot symbols and the first sequence of data symbols.

2. The apparatus of claim 1, wherein the set of subbands comprises N subbands uniformly distributed across K total subbands, wherein the subset of subbands comprises P subbands uniformly distributed across the N subbands, and wherein K, N and P are integers greater than one.

3. The apparatus of claim 2, wherein the first processor is operative to generate an interleaved frequency division multiple access (IFDMA) symbol with the sequence of pilot symbols sent on the subset of subbands.

4. The apparatus of claim 1, wherein the set of subbands comprises N adjacent subbands among K total subbands, wherein the subset of subbands comprises P subbands uniformly distributed across the N adjacent subbands, and wherein K, N and P are integers greater than one.

5. The apparatus of claim 4, wherein the first processor is operative to generate a localized frequency division multiple access (LFDMA) symbol with the sequence of pilot symbols sent on the subset of subbands.

6. The apparatus of claim 1, wherein the set of subbands comprises N subbands uniformly distributed across K total subbands, wherein the subset of subbands comprises P consecutive subbands among the N subbands, and wherein K, N and P are integers greater than one.

7. The apparatus of claim 6, wherein the first processor is operative to generate an interleaved frequency division multiple access (IFDMA) symbol with the sequence of pilot symbols sent on the subset of subbands.

8. The apparatus of claim 1, wherein the set of subbands comprises N adjacent subbands among K total subbands, wherein the subset of subbands comprises P adjacent subbands among the N subbands, and wherein K, N and P are integers greater than one.

9. The apparatus of claim 8, wherein the first processor is operative to generate a localized frequency division multiple access (LFDMA) symbol with the sequence of pilot symbols sent on the subset of subbands.

10. The apparatus of claim 1, wherein the set of subbands comprises N subbands selected from among K total subbands, wherein the subset of subbands comprises P subbands selected from among the N subbands, and wherein K, N and P are integers greater than one.

11. The apparatus of claim 10, wherein the first processor is operative to replicate the sequence of pilot symbols a plurality of times to generate an extended sequence with K pilot symbols, to apply a phase ramp to obtain a frequency-translated sequence, and to append a cyclic prefix to the frequency-translated sequence to generate an interleaved frequency division multiple access (IFDMA) symbol.

12. The apparatus of claim 10, wherein the first processor is operative to perform a discrete Fourier transform (DFT) on the sequence of pilot symbols to obtain frequency-domain values, to map the frequency-domain values onto the subbands in the subset, to map zero values onto remaining ones of the K total subbands, to perform an inverse discrete Fourier transform (IDFT) on the frequency-domain values and the zero values to obtain a sequence of time-domain output samples, and to append a cyclic prefix to the sequence of time-domain output samples to generate the SC-FDMA symbol.

13. The apparatus of claim 1, wherein the first processor is operative to generate data symbols, to generate at least one SC-FDMA symbol for the data symbols, and to time division multiplex (TDM) the at least one SC-FDMA symbol for the data symbols with the SC-FDMA symbol for the pilot symbols.

14. The apparatus of claim 1, wherein the first processor is operative to generate the sequence of pilot symbols based on a polyphase sequence having a constant envelope in the time domain and a flat spectral response in the frequency domain.

15. The apparatus of claim 1, wherein the set of subbands is used for pilot transmission by multiple transmitters.

16. The apparatus of claim 15, wherein the multiple transmitters are multiple wireless devices.

17. The apparatus of claim 15, wherein the multiple transmitters are multiple base stations.

18. The apparatus of claim 1, wherein the set of subbands is used for data transmission.

19. The apparatus of claim 1, wherein the multiple sets of subbands are used by multiple groups of transmitters for pilot transmission.

20. The apparatus of claim 1, wherein orthogonal pilots are transmitted by transmitters in different sectors of a wireless network.

21. The apparatus of claim 1 wherein the first sequence of pilot symbols is a SC-FDMA symbol.

22. The apparatus of claim 1 wherein the first sequence of data symbols is a SC-FDMA symbol.

23. The apparatus of claim 1, wherein the first processor is operative to determine different ones of the plurality of sets of subbands for different time slots based on a frequency hopping pattern.

24. A method comprising:
arranging a total number of available subbands into a plurality of predetermined sets of subbands that collectively constitute the total number of available subbands;
partitioning a set of subbands among the plurality of sets of subbands into a plurality of subsets of the set of subbands, wherein each of said subsets contains at least two subbands;
generating in a first processor a first sequence of pilot symbols for transmission in a subset of the set of subbands among the plurality of subsets of the set of subbands, the first sequence of pilot symbols being orthogonal to and configured to interlace with a second sequence of pilot symbols generated in a second processor for transmission in a further subset of the set of subbands among the plurality of subsets of the set of subbands, wherein at least one of the pilot symbols of the first sequence is generated for transmission simultaneously on the at least two subbands of the associated subset;
generating in the first processor a first sequence of data symbols, the first sequence of data symbols being non-orthogonal to a second sequence of data symbols generated in the second processor; and
transmitting the first sequence of pilot symbols and the first sequence of data symbols.

25. The method of claim 24 wherein the first sequence of pilot symbols is a SC-FDMA symbol.

26. The method of claim 25, wherein the generating the SC-FDMA symbol comprises
generating a localized frequency division multiple access (LFDMA) symbol with the sequence of pilot symbols sent on the subset of subbands.

27. The method of claim 25, wherein the generating the SC-FDMA symbol comprises
generating an interleaved frequency division multiple access (IFDMA) symbol with the sequence of pilot symbols sent on the subset of subbands.

28. The method of claim 25, wherein the generating the SC-FDMA symbol comprises
replicating the sequence of pilot symbols a plurality of times to generate an extended sequence with K pilot symbols,
applying a phase ramp to obtain a frequency-translated sequence, and
appending a cyclic prefix to the frequency-translated sequence to generate an interleaved frequency division multiple access (IFDMA) symbol.

29. The method of claim 25, wherein the generating the SC-FDMA symbol comprises
performing a discrete Fourier transform (DFT) on the sequence of pilot symbols to obtain frequency-domain values,
mapping the frequency-domain values onto the subbands in the subset,
mapping zero values onto remaining ones of the K total subbands,
performing an inverse discrete Fourier transform (IDFT) on the frequency-domain values and the zero values to obtain a sequence of time-domain output samples, and
appending a cyclic prefix to the sequence of time-domain output samples to generate the SC-FDMA symbol.

30. The method of claim 24 wherein the first sequence of data symbols is a SC-FDMA symbol.

31. An apparatus comprising:
means for arranging a total number of available subbands into a plurality of predetermined sets of subbands that collectively constitute the total number of available subbands;
means for partitioning a set of subbands among the plurality of sets of subbands into a plurality of subsets of the set of subbands, wherein each of said subsets contains at least two subbands;
a first symbol generator means for generating a first sequence of pilot symbols for transmission in a subset of the set of subbands among the plurality of subsets of the set of subbands, the first sequence of pilot symbols being orthogonal to and configured to interlace with a second sequence of pilot symbols generated in a second symbol generator means for transmission in a further subset of the set of subbands among the plurality of subsets of the set of subbands, wherein at least one of the pilot symbols of the first sequence is generated for transmission simultaneously on the at least two subbands of the associated subset;
said first symbol generator means including means for generating a first sequence of data symbols, the first sequence of data symbols being non-orthogonal to a second sequence of data symbols generated in the second symbol generator means; and
means for transmitting the first sequence of pilot symbols and the first sequence of data symbols.

32. The apparatus of claim 31 wherein the first sequence of pilot symbols is a SC-FDMA symbol.

33. The apparatus of claim 32, wherein the means for generating the SC-FDMA symbol comprises
means for generating a localized frequency division multiple access (LFDMA) symbol with the sequence of pilot symbols sent on the subset of subbands.

34. The apparatus of claim 32, wherein the means for generating the SC-FDMA symbol comprises generating an interleaved frequency division multiple access (IFDMA) symbol with the sequence of pilot symbols sent on the subset of subbands.

35. The apparatus of claim 32, wherein the means for generating the SC-FDMA symbol comprises
means for replicating the sequence of pilot symbols a plurality of times to generate an extended sequence with K pilot symbols,
means for applying a phase ramp to obtain a frequency-translated sequence, and
means for appending a cyclic prefix to the frequency-translated sequence to generate an interleaved frequency division multiple access (IFDMA) symbol.

36. The apparatus of claim 32, wherein the means for generating the SC-FDMA symbol comprises
means for performing a discrete Fourier transform (DFT) on the sequence of pilot symbols to obtain frequency-domain values,
means for mapping the frequency-domain values onto the subbands in the subset,
means for mapping zero values onto remaining ones of the K total subbands,
means for performing an inverse discrete Fourier transform (IDFT) on the frequency-domain values and the zero values to obtain a sequence of time-domain output samples, and
means for appending a cyclic prefix to the sequence of time-domain output samples to generate the SC-FDMA symbol.

37. The apparatus of claim 31 wherein the first sequence of data symbols is a SC-FDMA symbol.

38. An apparatus comprising:
a first processor adapted to
arrange a total number of available subbands into a plurality of predetermined sets of subbands that collectively constitute the total number of available subbands,
partition a set of subbands among the plurality of sets of subbands into a plurality of subsets of the set of subbands, wherein each of said subsets contains at least two subbands,
generate a first sequence of pilot symbols for transmission in a subset of the set of subbands among the plurality of subsets of the set of subbands, the first sequence of pilot symbols being orthogonal to and configured to interlace with a second sequence of pilot symbols generated in a second processor for transmission in a further subset of the set of subbands among the plurality of subsets of the set of subbands, wherein at least one of the pilot symbols of the first sequence is generated for transmission simultaneously on the at least two subbands of the associated subset, and
generate a first sequence of data symbols, the first sequence of data symbols being non-orthogonal to a second sequence of data symbols generated in the second processor;
a multiplexor to multiplex the first sequence of pilot symbols; and
a transmitter coupled to the first processor for transmitting the first sequence of pilot symbols and the first sequence of data symbols.

39. The apparatus of claim 38 wherein the first sequence of pilot symbols is a SC-FDMA symbol.

40. The apparatus of claim 39, wherein the first processor is operative to multiplex the SC-FDMA symbol onto a symbol period designated for pilot transmission and to transmit no data or pilot in at least one symbol period used for pilot transmission by at least one other transmitter.

41. The apparatus of claim 39, wherein the first processor is operative to generate at least two scaled SC-FDMA symbols based on the SC-FDMA symbol and an orthogonal code and to multiplex the at least two scaled SC-FDMA symbols onto at least two symbol periods designated for pilot transmission by at least two transmitters.

42. The apparatus of claim 39, wherein the first processor is operative to generate data symbols, to generate at least one SC-FDMA symbol for the data symbols, and to multiplex the at least one SC-FDMA symbol for the data symbols with the SC-FDMA symbol for the pilot symbols.

43. The apparatus of claim 38 wherein the first sequence of data symbols is a SC-FDMA symbol.

44. A method comprising:
arranging a total number of available subbands into a plurality of predetermined sets of subbands that collectively constitute the total number of available subbands;
partitioning a set of subbands among the plurality of sets of subbands into a plurality of subsets of the set of subbands, wherein each of said subsets contains at least two subbands;
generating in a first processor a first sequence of pilot symbols for transmission in a subset of the set of subbands among the plurality of subsets of the set of subbands, the first sequence of pilot symbols being orthogonal to and configured to interlace with a second sequence of pilot symbols generated in a second processor for transmission in a further subset of the set of subbands among the plurality of subsets of the set of subbands, wherein at least one of the pilot symbols of the first sequence is generated for transmission simultaneously on the at least two subbands of the associated subset;
generating in the first processor a first sequence of data symbols, the first sequence of data symbols being non-orthogonal to a second sequence of data symbols generated in the second processor;
multiplexing the first sequence of pilot symbols; and
transmitting the first sequence of pilot symbols and the first sequence of data symbols.

45. The method of claim 44 wherein the first sequence of pilot symbols is a SC-FDMA symbol.

46. The method of claim 45, wherein the multiplexing the SC-FDMA symbol comprises
generating at least two scaled SC-FDMA symbols based on the SC-FDMA symbol and an orthogonal code, and
multiplexing the at least two scaled SC-FDMA symbols onto at least two symbol periods designated for pilot transmission by at least two transmitters.

47. The method of claim 44 wherein the first sequence of data symbols is a SC-FDMA symbol.

48. An apparatus comprising:
means for arranging a total number of available subbands into a plurality of predetermined sets of subbands that collectively constitute the total number of available subbands;
means for partitioning a set of subbands among the plurality of sets of subbands into a plurality of subsets of the set of subbands, wherein each of said subsets contains at least two subbands;
a first symbol generator means for generating a first sequence of pilot symbols for transmission in a subset of the set of subbands among the plurality of subsets of the set of subbands, the first sequence of pilot symbols being orthogonal to and configured to interlace with a second sequence of pilot symbols generated in a second symbol generator means for transmission in a further subset of the set of subbands among the plurality of subsets of the set of subbands, wherein at least one of the pilot symbols of the first sequence is generated for transmission simultaneously on the at least two subbands of the associated subset;

said first symbol generator means including means for generating a first sequence of data symbols, the first sequence of data symbols being non-orthogonal to a second sequence of data symbols generated in the second symbol generator means;

means for multiplexing the first sequence of pilot symbols; and means for transmitting the first sequence of pilot symbols and the first sequence of data symbols.

49. The apparatus of claim 48 wherein the first sequence of pilot symbols is a SC-FDMA symbol.

50. The apparatus of claim 49, wherein the means for multiplexing the SC-FDMA symbol comprises means for generating at least two scaled SC-FDMA symbols based on the SC-FDMA symbol and an orthogonal code, and means for multiplexing the at least two scaled SC-FDMA symbols onto at least two symbol periods designated for pilot transmission by at least two transmitters.

51. The apparatus of claim 48 wherein the first sequence of data symbols is a SC-FDMA symbol.

52. An apparatus comprising:
a first processor adapted to
arrange a total number of available subbands into a plurality of predetermined sets of subbands that collectively constitute the total number of available subbands, partition a set of subbands among the plurality of sets of subbands into a plurality of subsets of the set of subbands, wherein each of said subsets contains at least two subbands, generate a first sequence of pilot symbols having a first duration for transmission in a subset of the set of subbands among the plurality of subsets of the set of subbands, the first sequence of pilot symbols being orthogonal to and configured to interlace with a second sequence of pilot symbols generated in a second processor for transmission in a further subset of the set of subbands among the plurality of subsets of the set of subbands, wherein at least one of the pilot symbols of the first sequence is generated for transmission simultaneously on the at least two subbands of the associated subset, and generate a first sequence of data symbols, having a second duration, the first sequence of data symbols being non-orthogonal to a second sequence of data symbols generated in the second processor;

a multiplexor to multiplex the first sequence of pilot symbols; and a transmitter coupled to the first processor for transmitting the first sequence of pilot symbols and the first sequence of data symbols.

53. The apparatus of claim 52, wherein the first symbol duration is shorter than the second symbol duration.

54. The apparatus of claim 52, wherein the first processor is operative to determine a set of subbands selected from among at least two sets of subbands, to determine a subset of subbands to use for pilot transmission, wherein the subset of subbands is selected from among at least two subsets of subbands formed with the set of subbands, and to generate the at least one pilot SC-FDMA symbol with the pilot symbols sent on the subset of subbands.

55. The apparatus of claim 52 wherein the first sequence of pilot symbols is a SC-FDMA symbol.

56. The apparatus of claim 52 wherein the first sequence of data symbols is a SC-FDMA symbol.

57. The apparatus of claim 55, wherein the first processor is operative to generate at least two scaled pilot SC-FDMA symbols based on the at least one pilot SC-FDMA symbol and an orthogonal code and to multiplex the at least two scaled pilot SC-FDMA symbols onto at least two symbol periods designated for pilot transmission.

58. The apparatus of claim 55, wherein the first processor is operative to multiplex the at least one pilot SC-FDMA symbol onto at least one symbol period designated for pilot transmission and to not transmit data or pilot in at least one other symbol period used for pilot transmission by remaining ones of the at least two transmitters.

59. A method comprising:
arranging a total number of available subbands into a plurality of predetermined sets of subbands that collectively constitute the total number of available subbands;

partitioning a set of subbands among the plurality of sets of subbands into a plurality of subsets of the set of subbands, wherein each of said subsets contains at least two subbands;

generating in a first processor a first sequence of pilot symbols having a first duration for transmission in a subset of the set of subbands among the plurality of subsets of the set of subbands, the first sequence of pilot symbols being orthogonal to and configured to interlace with a second sequence of pilot symbols generated in a second processor for transmission in a further subset of the set of subbands among the plurality of subsets of the set of subbands, wherein at least one of the pilot symbols of the first sequence is generated for transmission simultaneously on the at least two subbands of the associated subset;

generating in the first processor a first sequence of data symbols, having a second duration, the first sequence of data symbols being non-orthogonal to a second sequence of data symbols generated in the second processor;

multiplexing the first sequence of pilot symbols; and transmitting the first sequence of pilot symbols and the first sequence of data symbols.

60. The method of claim 59 wherein the first sequence of pilot symbols is a SC-FDMA symbol.

61. The method of claim 60, wherein the multiplexing the at least one pilot SC-FDMA symbol with the at least one data SC-FDMA symbol comprises generating at least two scaled pilot SC-FDMA symbols based on the at least one pilot SC-FDMA symbol and an orthogonal code, and multiplexing the at least two scaled pilot SC-FDMA symbols onto at least two symbol periods designated for pilot transmission.

62. The method of claim 59 wherein the first sequence of data symbols is a SC-FDMA symbol.

63. An apparatus comprising:
means for arranging a total number of available subbands into a plurality of predetermined sets of subbands that collectively constitute the total number of available subbands;

means for partitioning a set of subbands among the plurality of sets of subbands into a plurality of subsets of the set of subbands, wherein each of said subsets contains at least two subbands;

a first symbol generator means for generating a first sequence of pilot symbols having a first duration for transmission in a subset of the set of subbands among the plurality of subsets of the set of subbands, the first sequence of pilot symbols being orthogonal to and configured to interlace with a second sequence of pilot symbols generated in a second symbol generator means for transmission in a further subset of the set of subbands among the plurality of subsets of the set of subbands, wherein at least one of the pilot symbols of the first sequence is generated for transmission simultaneously on the at least two subbands of the associated subset;

said first symbol generator means including means for generating a first sequence of data symbols, having a second duration, the first sequence of data symbols being non-orthogonal to a second sequence of data symbols generated in the second symbol generator means;

means for multiplexing the first sequence of pilot symbols; and means for transmitting the first sequence of pilot symbols and the first sequence of data symbols.

64. The apparatus of claim 63 wherein the first sequence of pilot symbols is a SC-FDMA symbol.

65. The apparatus of claim 64, wherein the means for multiplexing the at least one pilot SC-FDMA symbol with the at least one data SC-FDMA symbol comprises means for generating at least two scaled pilot SC-FDMA symbols based on the at least one pilot SC-FDMA symbol and an orthogonal code, and means for multiplexing the at least two scaled pilot SC-FDMA symbols onto at least two symbol periods designated for pilot transmission.

66. The apparatus of claim 63 wherein the first sequence of data symbols is a SC-FDMA symbol.

67. A non-transitory computer readable storage medium embedded with software code comprising:

code for causing a first processor to arrange a total number of available subbands into a plurality of predetermined sets of subbands that collectively constitute the total number of available subbands;

code for causing the first processor to generate a first sequence of pilot symbols for transmission in a subset of a particular said set of subbands among a plurality of subsets of the particular set of subbands, the first sequence of pilot symbols being orthogonal to and configured to interlace with a second sequence of pilot symbols generated in a second processor for transmission in a further subset of the particular set of subbands among the plurality of subsets of the particular set of subbands, wherein each of said subsets contains at least two subbands, and wherein at least one of the pilot symbols of the first sequence is generated for transmission simultaneously on the at least two subbands of the associated subset, and code for causing the first processor to generate a first sequence of data symbols, the first sequence of data symbols being non-orthogonal to a second sequence of data symbols generated in the second processor; and code for causing the first processor to command a transmission of the first sequence of pilot symbols and the first sequence of data symbols.

* * * * *